(12) United States Patent
Zhiyanov

(10) Patent No.: US 10,565,498 B1
(45) Date of Patent: Feb. 18, 2020

(54) DEEP NEURAL NETWORK-BASED RELATIONSHIP ANALYSIS WITH MULTI-FEATURE TOKEN MODEL

(71) Applicant: Amazon Technologies, Inc., Seattle, WA (US)

(72) Inventor: Dmitry Vladimir Zhiyanov, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 527 days.

(21) Appl. No.: 15/445,698

(22) Filed: Feb. 28, 2017

(51) Int. Cl.
  *G06N 3/08* (2006.01)
  *G06N 3/04* (2006.01)
  *G06N 7/00* (2006.01)

(52) U.S. Cl.
  CPC ............. *G06N 3/08* (2013.01); *G06N 3/0445* (2013.01); *G06N 7/005* (2013.01)

(58) Field of Classification Search
  CPC ......... G06N 3/08; G06N 3/0445; G06N 7/005
  USPC ........................................................ 706/25
  See application file for complete search history.

(56) References Cited

U.S. PATENT DOCUMENTS

| | | | |
|---|---|---|---|
| 6,169,969 | B1 | 1/2001 | Cohen |
| 6,327,561 | B1 | 12/2001 | Smith et al. |
| 6,363,381 | B1 | 3/2002 | Lee et al. |
| 7,644,127 | B2 | 1/2010 | Yu |
| 7,912,705 | B2 | 3/2011 | Wasson et al. |
| 2018/0114112 | A1* | 4/2018 | Willson ............... G06F 17/276 |

OTHER PUBLICATIONS

Jane Bromley, et al., "Signature Verification using a "Siamese" Time Delay Neural Network", AT&T Bell Laboratories, 1994, pp. 737-744.
Oriol Vinyals, et al., "Matching Networks for One Shot Learning", In Advances in Neural Information Processing Systems, 2016, pp. 1-12.
Jordan Burgess, et al., "One-Shot Learning in Discriminative Neural Networks", Workshop on Bayesian Deep Learning, NIPS 2016, pp. 1-3.
Anonymous, "Classification—TensorFlow", Retrieved from URL: https://www.tensorflow.org/versions/r0.10/api_docs/python/nn/classification#sigmoid_cross_entropy_with_logits on Feb. 15, 2017, pp. 1-5.
Wikipedia, "Keras", Retrieved from URL: https://en.wikipedia.org/wiki/Keras on Feb. 15, 2017, pp. 1-2.

(Continued)

*Primary Examiner* — Shane D Woolwine
(74) *Attorney, Agent, or Firm* — Robert C. Kowert; Kowert, Hood, Munyon, Rankin & Goetzel, P.C.

(57) ABSTRACT

A data set whose records include respective pairs of entity descriptors with at least some text and a representation of a relationship such as similarity between the entities of the pair is obtained. Using the data set, a neural network model is trained to generate relationship indicators for pairs of entity descriptors. In an extensible token model of the neural network model, a text token of a first attribute of a particular entity descriptor is represented by a plurality of features including a first feature which was added to the token model as a result of a programmatic request. A particular relationship indicator corresponding to a source entity descriptor and a target entity descriptor is generated using the trained neural network model.

22 Claims, 14 Drawing Sheets

(56) References Cited

OTHER PUBLICATIONS

Amazon Web Services, "Amazon Machine Learning—Developer Guide Version Latest", Updated Aug. 2, 2016, pp. 1-146.
Gregory Koch, et al., "Siamese Neural Networks for One-shot Image Recognition", In Proceeding of the 32nd International Conference on Machine Learning, JMLR: W &CP vol. 37, 2015, pp. 1-8.
Colah's Blog, "Understanding LSTM Networks", Posted on Aug. 27, 2015, pp. 1-22.

* cited by examiner

FIG. 8

Token data type feature values 910A (t="text-only", d="digits-only", o = "other")

| Title | t | o | t | o | o | o | o | t | o | t |
|---|---|---|---|---|---|---|---|---|---|---|
| Brand | t | | | | | | | | | |
| Model | t | d | | | | | | | | |
| Weight | d | o | d | | | | | | | |
| Color | | | | | | | | | | |

Token data type feature values 910B

| Title | t | o | t | o | o | o | o | t | o | d |
|---|---|---|---|---|---|---|---|---|---|---|
| Brand | t | | | | | | | | | |
| Model | t | o | d | t | | | | | | |
| Weight | d | o | | | | | | | | |
| Color | t | | | | | | | | | |

Token case-based feature values 915A (Az ="starts with upper-case", AZ = "all-upper-case", etc.)

| Title | Az | NA | Az | NA | NA | NA | NA | NA | NA | Az |
|---|---|---|---|---|---|---|---|---|---|---|
| Brand | Az | | | | | | | | | |
| Model | AZ | NA | | | | | | | | |
| Weight | NA | NA | az | NA | | | | | | |
| Color | | | | | | | | | | |

Token case-based feature values 915B

| Title | Az | NA | Az | NA | NA | NA | NA | NA | NA | NA |
|---|---|---|---|---|---|---|---|---|---|---|
| Brand | | | | | | | | | | |
| Model | | | | | | | | | | |
| Weight | NA | az | NA | Az | az | | | | | |
| Color | Az | NA | | | | | | | | |

Normalized token feature values 1010A (source item descriptor)

| | | | | | | | | |
|---|---|---|---|---|---|---|---|---|
| Title | companya | | triumph | | carriage | | charcoal | scarlet |
| Brand | companya | | | | | | | |
| Model | wse | 3032 | | | | | | |
| Weight | 16 | | | 8 | | | | |
| Color | | | | | | | | |

Same-descriptor token occurrence features and binary masks 1015A (Title=t, Brand=b, Model=m, Weight=w, Color=c)

"companya" occurrences 1020A → ← "  " occurrences 1020B

| | | | | | | | | |
|---|---|---|---|---|---|---|---|---|
| Title | tb,11000 | | tw,10010 | t,10000 | tw,10010 | tw,10010 | t,10000 | t,10000 |
| Brand | tb,11000 | | | | | | | |
| Model | m,00100 | m,00100 | | | | | | |
| Weight | w,00010 | w,00010 | | w,00010 | tw,10010 | tw,10010 | w,00010 | |
| Color | | | | | | | | |

Normalized token feature values 1010B (similarity-candidate item descriptor)

| | | | | | | |
|---|---|---|---|---|---|---|
| Title | companya | | triumph | 2012 | carriage | wse | 3032 |
| Brand | | | | | | | |
| Model | | | | | | | |
| Weight | 16 | lb | 13 | oz | | | |
| Color | charcoal | | scarlet | | | | |

Same-descriptor token occurrence features and binary masks 1015B

| | | | | | | |
|---|---|---|---|---|---|---|
| Title | t,10000 | twc,10011 | t,10000 | twc,10011 | t,10000 | twc,10011 | t,10000 |
| Brand | | | | | | | |
| Model | | | | | | | |
| Weight | w,00010 | w,00010 | twc,10011 | w,00010 | | | |
| Color | c,00001 | twc,10011 | c,00001 | | | | |

DEEP NEURAL NETWORK-BASED RELATIONSHIP ANALYSIS WITH MULTI-FEATURE TOKEN MODEL

BACKGROUND

Records for many kinds of large-scale business applications are often stored in electronic form. For example, a global electronic retailer may use electronic records containing text as well as non-text attributes to store information about millions of items that are available for sale, and publish at least some portions of the item descriptions contained in the electronic records to enable customers to select and purchase the items. Similarly, a large medical organization may store medical records for millions of customers. Although some organizations may attempt to standardize the manner in which information about entities is stored internally, such standardized approaches may not always succeed. For example, in environments in which a variety of vendors or product suppliers sell their items through a common re-seller, different vendors may use respective approaches towards describing items. Furthermore, the standardization approaches may differ from one organization to another, which may for example make it somewhat difficult to determine whether an item description at one e-retail web site is necessarily referring to the same item as another differently-formatted item description at another web site.

The ability to resolve entity or product information-related ambiguities (such as slightly different descriptions of the same item, or very similar descriptions of distinct items) may be extremely important for many organizations. For example, consider a scenario in which the same product is being sold on behalf of several different product suppliers via a particular retailing web-site, at which for each available product, a "details" web page is made available to potential customer. If different details pages are provided, based on the differences in the way that the product suppliers describe their product, this may lead to customer confusion, lowered customer satisfaction or even lower sales than may have been achieved had the products been clearly and unambiguously identified as being identical. Resolving such ambiguities, given various natural-language descriptions of items originating at different sources, may present a non-trivial technical challenge, especially in environments in which the item catalog or inventory size is extremely large and tends to change rapidly.

BRIEF DESCRIPTION OF DRAWINGS

FIG. 8 illustrates examples of token model feature values which may be obtained by normalization and stemming of tokens, and by determining token lengths, according to at least some embodiments.

FIG. 9 illustrates examples of token model feature values which may be obtained by taking token data types and case information into account, according to at least some embodiments.

FIG. 10 illustrates examples of token model feature values which may be obtained by determining the set of attributes, within a given item descriptor, in which a particular token is present, according to at least some embodiments.

Figure 1:
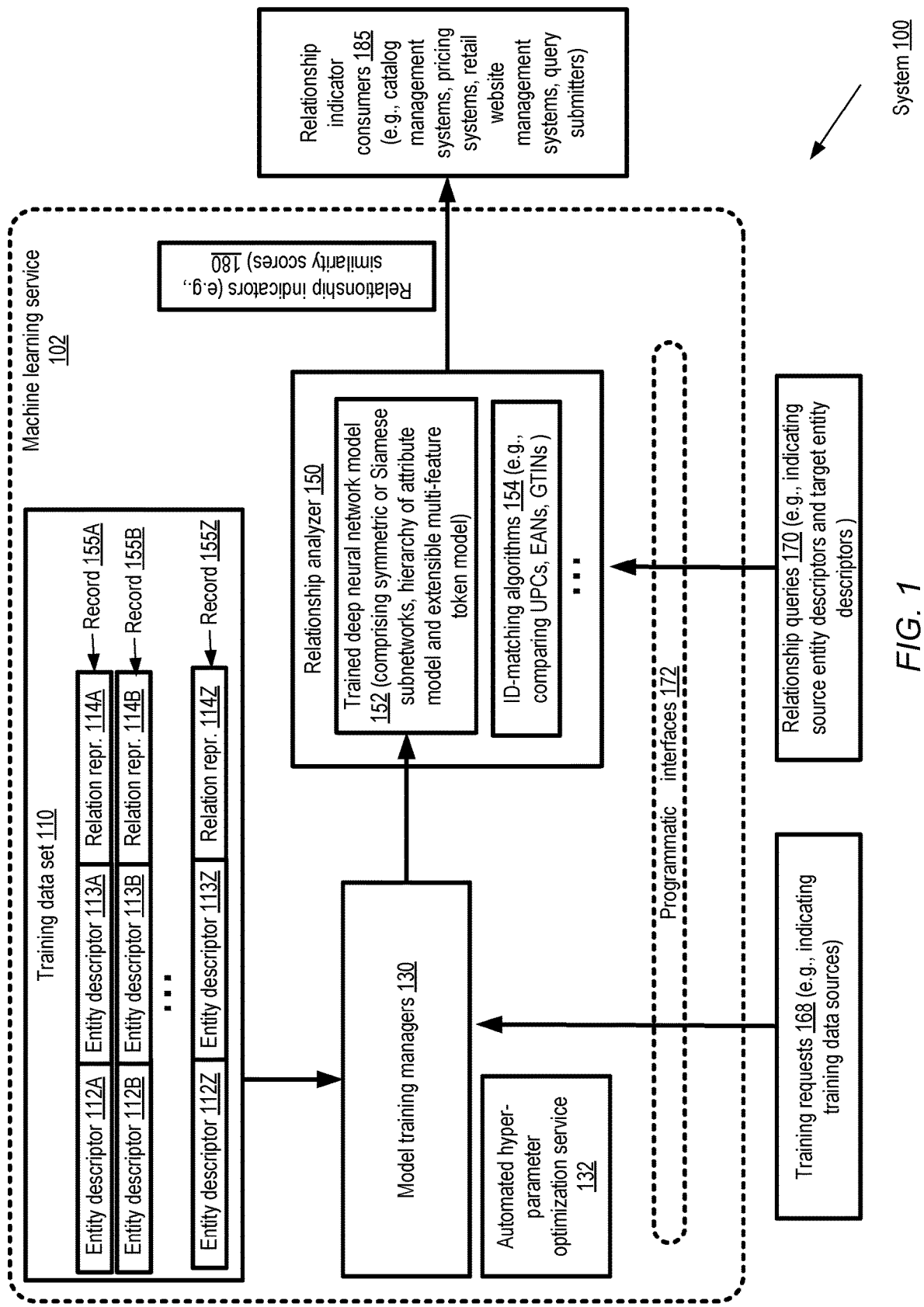
FIG. 1 illustrates an example system environment in which relationship analysis with respect to entity descriptors may be performed using a deep neural network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for a relationship analysis system which employs an extensible multi-feature token model as part of a deep neural network model are described. Such a relationship analysis system may use the neural network model to generate, for a given pair of entities for which at least some text information is available, relationship indicators of any of several types in different embodiments. For example, according to some embodiments, the relationship analysis system may generate, given a pair of item descriptors containing values for various attributes of a corresponding pair of items, a similarity score which represents how similar the two items of the pair are to each other, or a difference score indicating the extent to which the two items differ with respect to one or more attributes. Other types of relationship indicators generated in various embodiments may include, for example, inclusion scores or participation scores. For example, if one of the entities of a pair being analyzed is an individual item and the other entity represents a group of items such as a brand or category, an inclusion score may indicate the probability that the item has the indicated brand or belongs to the indicated category. A participation score may indicate, for example, a probability that one entity (e.g., an actor) participated in or was involved in an activity represented by the other entity (e.g., a motion picture). In much of the following description, similarity analysis with respect to pairs of individual items is used as the primary example of the kind of relationship analysis being performed; as such, the relationship analysis system may also be referred to in some embodiments as a similarity analyzer or similarity analysis system. In various embodiments, neural network model-based techniques similar to those described herein with respect to item similarity analysis may be applied with equal success to other types of relationships (including but not necessarily limited to the difference relationships, inclusion relationships and participation relationships mentioned above) and to other types of entities, such as groups of items (e.g., brands or item categories), individuals (e.g., actors) or content sources (e.g., films, television shows, etc.).

In one embodiment in which item-level similarity analysis is performed, a similarity score may represent a probability that the two items "match" (that is, the two descriptors refer to the same underlying item), expressed as a percentage or a real value between 0.0 and 1.0. In at least some embodiments, the deep neural network model may comprise a hierarchy of sub-models or subnetworks, such as one or more attribute-level models to which the output of the token models may be provided as input, as well as one or more dense or fully-connected layers of artificial neurons. The artificial neurons of the model may also be referred to in various embodiments as nodes of the model. In some embodiments, the deep neural network may comprise one or more pairs of mirrored or "Siamese" subnetworks, in which for example the arrangement of artificial neuron units is similar or identical in the two subnetworks, a common objective function or loss function is used to determine various parameter values such as weights at the two subnetworks, and/or a change to a weight at one artificial neuron on one of the subnetworks is automatically duplicated at a corresponding neuron of the other subnetwork. In other embodiments, mirrored or Siamese subnetworks may not necessarily be employed. In various embodiments, the relationship analysis system may comprise one or more computing devices. In some embodiments, the relationship analysis system may be implemented as a subcomponent of a more general network-accessible machine learning system, while in other embodiments, the relationship analysis system may be implemented as a standalone tool which may not necessarily be part of or associated with a network-accessible system.

According to some embodiments, a training data set for the deep neural network model, comprising a plurality of records containing information about respective pairs of items or entities may be obtained. A given record may, for example, comprise a pair of item descriptors, where an individual item descriptor of a pair of item descriptors indicates respective values for a set of attributes (e.g., a title or name of an item, a brand of the item, a size/weight, etc.) of one of the items. In some embodiments, one of the item descriptors of a pair being analyzed may be termed a "source" item descriptor and the other may be referred to as a "similarity-candidate" or "target" item descriptor. In various embodiments, the goal of the training process may be to generate a model that is able, given a source item descriptor and a target item descriptor which were not included in the training data set, to determine whether the items represented by the item descriptors are identical, or more generally, to determine a measure of similarity between the represented items.

At least some of the attributes of an item descriptor may comprise text in various embodiments. In at least some embodiments, a given record of the training data set may also include a label indicating whether the two items represented by respective item descriptors of the record match each other—e.g., whether the two items are identical (even if their descriptors may not be identical). In other embodiments, the label may not necessarily be binary in nature—e.g., instead of indicating "match" vs. "no-match", the label may comprise a similarity indicator. Such a similarity indicator may, for example, be represented by a numerical value between 0.0 and 1.0 in some embodiments, where a value of 1.0 may indicate that the two items match and a value of 0.0 may indicate that the two items are extremely dissimilar, with values closer to 1.0 indicating higher levels of similarity. As such, the similarity indicators of the training records in some embodiments may be considered analogous to the similarity scores, discussed above, that are eventually produced by the trained model with respect to unlabeled item descriptor pairs.

A neural network model may be trained using a variety of features extracted from the training data set in various embodiments. The neural network model may logically comprise a hierarchy of layers in some embodiments, including a token model layer for capturing characteristics of individual text tokens such as words or numbers, an attribute model layer (for capturing characteristics of potentially multi-token attributes) to which the output of the token models are provided as inputs, and one or more fully-connected or dense layers to which the output of the attribute model layer may be provided as input. The output of the neural network model as a whole may comprise, for a given pair of item descriptors in one embodiment, a numerical similarity score generated by the dense layer(s). During the training of the model, a cross-entropy loss metric between the numerical similarity score (expressed as a probability of a match between the two items of the pair being considered) and the similarity indicator label the corresponding training data record may be used as the objective function in at least some embodiments. Other objective functions may be used in other embodiments.

One or more transformations or pre-processing operations may be performed on the raw attribute values in various embodiments to generate a set of features derived from the text of the attributes. In one embodiment, for example, the text content of a given attribute may be parsed, tokenized (separated into sequences of characters along boundaries such as white-space, punctuation, or transitions from text to digits or digits to text), normalized and stemmed, resulting in a set of one or more tokens in a standard format. The set of features for a given token of a particular item descriptor of a pair of item descriptors may include, for example, a first binary mask or bit vector indicating whether other attributes of the particular item descriptor include the text token (and if so, which attributes include it) in one embodiment. Another feature may comprise a second binary mask indicating whether an attribute of the other item descriptor of the pair includes the given text token (and if so, which attributes of the other item descriptor include it) in some embodiments. Such binary mask features may be used in some embodiments to mimic, to at least a limited extent, an approach a human may use when comparing two item descriptions—e.g., if a human is not able to immediately determine that the two items are identical, the human may try to see if the same words occur in both descriptions. In additional, the feature set generated for a given text token may include the actual normalized characters of the token, representations of the length of the token, data type of the token (e.g., whether it consists of alphabet characters, numerals or other symbols), case information of the raw token, etc., as discussed below in further detail.

Respective numeric vectors and/or matrices representing the feature set of a given token may be generated in at least some embodiments and provided as input to a mirrored token-level subnetwork of the neural network model. The token-level subnetwork may also comprise one or more hidden layers and/or a dense output layer in some embodiments, whose output may comprise intermediate vector values fed to the attribute model subnetworks. In at least some embodiments, the attribute model subnetworks, which may also be arranged in a mirrored arrangement with one subnetwork associated with each item descriptor of a pair, may comprise some number of recurrent neural network (RNN) units such as Long Short Term Memory units. Such RNN units may enable positional information about tokens within a given attribute to be taken into account—e.g., the occurrence of a numeric token such as "5" immediately before a token representing a measurement unit such as "ounce" may be more meaningful than if the "ounce" occurs at a word position before the "5", and such differences may be captured using the RNN units. In at least one embodiment, RNN units such as LSTMs may not necessarily be employed.

In at least some embodiments, a common or shared attribute model architecture may be used for several or all attribute types (e.g., "Title" attribute versus "Brand" versus "Weight" attribute types), while in other embodiments different attribute model architectures may be employed for different attribute types. In embodiments in which a shared attribute model architecture is used, the initialization of the instances of that shared architecture may be performed using an attribute-specific approach—e.g., the initial state and initial parameter settings may differ for a model instance used for a "Title" attribute from the initial state and initial parameter settings for a model instance used for a "Brand" or "Size" attribute. Further details regarding the architecture of the models and the interactions between the layers are provided below.

After the neural network model has been trained, it may be deployed to respond to similarity queries which may be submitted using one or more programmatic interfaces in various embodiments. In response to a particular similarity query indicating a source item descriptor D1 and a similarity-candidate item descriptor D2, a similarity score may be generated in at least some embodiments and provided or transmitted to the requester and/or to one or more similarity data consumers such as product catalog management systems, pricing management systems, and the like. In at least one embodiment, the similarity scores may be stored, e.g., in one or more repositories of the machine learning service or the similarity analyzer tool.

In some embodiments, values for a set of hyper-parameters (sometimes referred to as meta-parameters), as distinguished from the weights, biases etc. of the neural network model which are considered learned parameters, may have to be selected before the model is trained. In at least one embodiment, the machine learning service may comprise an automated hyper-parameter optimization service, which may be employed to select values for the hyper-parameters before various stages of training, testing or evaluation. The hyper-parameter optimization service may use a variety of techniques internally to select the values, including for example Bayesian optimization using Gaussian process priors in some embodiments. The hyper-parameters whose values may be determined using the service may include, among others, a minimum token occurrence frequency for inclusion of a token in a dictionary used in the neural network model, a type of gradient descent algorithm (or other learning algorithm) to be used during training, a dropout parameter for various LSTM nodes, state vector sizes for different subnetworks of the neural network model, intermediate result vector sizes, feature vector lengths, and/or the number of nodes at various hidden, input or output layers of subnetworks of the neural network model or the neural network model as a whole in various embodiments.

In various embodiments one or more programmatic interfaces may be implemented by the machine learning service or the similarity/relationship analyzer. Such programmatic interfaces, which may include for example web-based consoles, application programming interfaces (APIs), command-line tools, graphical user interfaces and the like in various embodiments. Using the programmatic interfaces, in some embodiments requests to train neural network models of the kind discussed above using various specified training data sets may be submitted, and/or requests to generate similarity scores for specified pairs or groups of item descriptors may be submitted in various embodiments.

In at least some embodiments, one or more phases of a similarity analysis pipeline or workflow (or more generally a relationship analysis pipeline) may be performed using multiple execution platforms in parallel. For example, in one embodiment, the pre-processing of a large training data set comprising thousands or even millions of item descriptors may be performed in a parallelized manner, in which token model feature values for respective subsets of the training data are generated on distinct sets of machines. In another embodiment, predictions for large similarity queries may be performed in parallel—e.g., if a request to determine similarity scores for 1,000,000 pairs of items is received, respective trained instances of the neural network model may be deployed at N different machines, each handling 1,000,000/N of the pairs. In some embodiments, the resources of various network-accessible services of a provider network (which may also be referred to as "public cloud" environments) may be employed to handle large training data sets and/or large volumes of similarity predictions.

It is noted that although much of the following description, the neural network-based similarity analysis technique is discussed using examples of retail items being compared, similar techniques may be employed in various embodiments for other problem domains. For example, in some embodiments the algorithms discussed herein may be used for analyzing medical records, legal records and the like. As also indicated earlier, the technique may be applied in various embodiment to analyze not just similarity between individual items, but other types of relationships such as differences, inclusion, participation and the like for a broader set of entities (such as groups of items).

Example System Environment

FIG. 1 illustrates an example system environment in which relationship analysis with respect to entity descriptors may be performed using a deep neural network, according to at least some embodiments. As shown, system 100 may comprise various resources of a machine learning service 102 comprising a relationship analyzer 150. The machine learning service 102 may provide a number of programmatic interfaces 172 which may be used by service clients to submit model training requests 168 and/or relationship queries 170 in the depicted embodiment. A model training request 168 may indicate a training data set 110 which is to be used to generate a relationship analysis model which can be used to respond to queries 170 in various embodiments. A given training data set 110 may include a plurality of training records 155, such as training records 155A-155Z in the depicted embodiment. A given training record 155 may comprise a pair of entity descriptors 112 and 113 (such as entity descriptor 112A and 113A of record 155A, entity descriptor 112B and 113B of record 155B, and entity descriptor 112Z and 113Z of record 155Z), as well as a relationship representation label 114 (e.g., relationship representation 114A-114Z) in the depicted embodiment. For example, in an embodiment in which each of the entities of a given record is an individual item and item similarity analysis is to be performed, a given relationship representation label 114 may comprise a "match" indicator. In some embodiments, a match indicator label 114 of a training record may bet set to one of two values: one value (e.g., "1" or "match") if the two item descriptors of the training record represent the same underlying item, and a second value (e.g., "0" or "no-match") if the two item descriptors represent different items. In other embodiments, the match indicator label may take more than two possible values—e.g., a real number between 0.0 and 1.0 may be assigned to each record, or an integer between 0 and 100 may be assigned, with higher numerical values indicating greater similarities between the item descriptors of the record. Match indicators may also be referred to as similarity indicators in various embodiments. Individual entity descriptors 112 and 113 may comprise respective values for one or more attributes, including at least some attributes which comprise text in some embodiments.

In response to a training request 168 received via a programmatic interface 172, a model training manager 130 (which may comprise one or more computing devices) may initiate the process of training a deep neural network model 152 in the depicted embodiment. The deep neural network model may include a hierarchy of several layers or subnetworks in some embodiments, including for example a token model layer, an attribute model layer, as well as one or more fully-connected or dense layers, each comprising some number of artificial neurons or nodes. In at least one embodiment, one or more pairs of subnetworks of the model may be organized in a mirrored architecture, which may also be referred to as a Siamese neural network architecture. In such a mirrored approach, during training, the weights and parameters of a given subnetwork of a mirrored pair may be learned based on a common shared objective function, such as a function which uses a cross-entropy metric between a predicted similarity score (e.g., a probability of a match between the two item descriptors of a record) and a match indicator label assigned to the corresponding training record. In at least one implementation, changes to the weight of one artificial neuron in one subnetwork of a mirrored pair of subnetworks may be replicated at the corresponding artificial neuron or node of the other subnetwork. The architecture or layout (e.g., the number of nodes at each sub-layer and the interconnections between the sub-layers) of mirrored subnetworks may be identical in at least some embodiments. In at least one embodiment, the Siamese or mirrored architecture may not be used, e.g., if the types of entities within a given record 155 differ from one another.

In various embodiments, recurrent neural network (RNN) units may be employed at one or more layers of the model hierarchy. RNNs, which may comprise loops of connections between nodes or neurons, may be able to persist (or have a "memory" of) information that was previously analyzed in various embodiments, and may thus be able to incorporate information about the sequence or relative positions of various text tokens within attributes of the item descriptors in such embodiments. In some embodiments, Long Short Term Memory (LSTM) units may be used for one or more RNN layers of the deep neural network model 152. In other embodiments, other RNN variants may be used, such as gated recurrent units (GRUs), bi-directional RNNs, depth-gated RNNs, clockwork RNNs and the like. In some embodiments, RNNs may not be used.

In at least some embodiments, the token model layer of the deep neural network 152 (which may also be configured in a mirrored configuration with respect to the two entity descriptors 112 and 113 of a training record 155 being analyzed) may utilize a plurality of text token features. For example, in some embodiments the token features may comprise representations of the characters which form (a normalized version of) the token, token length (the number of characters forming the token), token casing and data type, as well as information about the presence or absence of a given text token within other attributes of the same entity descriptor or the other entity descriptor of the pair. In one embodiment, one feature associated with a given token T1 of a given attribute A1 of an entity descriptor 112 of a record 155 may comprise a binary mask or bit vector indicating which other attributes (e.g., A2, A3, etc., apart from A1 itself, if any) of the descriptor 112 contain T1. In at least some embodiments, another feature associated with a given token T1 of an attribute A of an entity descriptor 112 may comprise a binary mask or bit map indicating which attributes, if any, of the other entity descriptor 113 of the record 155 comprise T1. In at least some embodiments, the token model may be extensible—e.g., programmatic interfaces may be provided by the machine learning model to add or modify token-related features of the deep neural network model.

In various embodiments, the machine learning model 102 may comprise an automated hyper-parameter optimization service 132. Such a service may be utilized by training managers 130 to determine values of various hyper-parameters of the deep neural networking model 152 and/or other models. The hyper-parameters whose values are recommended by the service 132 may include, for example, the particular gradient-based learning algorithm to be used, the numbers of nodes at various layers of the model, minimum token occurrence frequency for inclusion of a token in a dictionary used in the deep neural network model 152, a type of gradient descent algorithm (or other learning algorithm) to be used during training, dropout parameters for various LSTM nodes, state vector sizes for different subnetworks of the deep neural network model, intermediate result vector sizes, feature vector lengths, and so on.

In some embodiments, more than one type of relationship analysis technique may be employed at the machine learning service 102. For example, as shown, a more straightforward identifier-matching (ID-matching) algorithm 154 than the neural network based approach may be implemented for similarity analysis in the depicted embodiment. Instead of or in addition to using a deep neural network model 152, which may be capable of determining similarities or matches between entity descriptors which comprise arbitrary text, an ID-matching algorithm 154 may be used in some embodiments for entity descriptors which may comprise item identifiers expressed in well-known formats such as UPCs (Universal Product Codes), EANs (European Article Numbers or International Article Numbers), GTINs (Global Trade Item Numbers) or the like. If the entity descriptors being compared contain such standard identifiers in unambiguous locations (e.g., in a respective Item ID field in the descriptors), the task of determining matches or similarities may be simplified, and there may not be a need for deep neural network models to be trained in some embodiments. Of course, in practice, such unambiguous identification may not always be possible, and more general deep neural networks of the kind described herein may be employed to handle item descriptors whose contents are potentially more ambiguous and/or not necessarily formatted according to standard rules. In at least one embodiment, when similarity analysis is to be performed with respect to a given pair of entity descriptors indicated in a relationship query 170, the descriptors may first be checked to determine whether a straightforward ID-matching algorithm 154 is sufficient, and the neural network model 152 may be employed if the ID-matching algorithm is unable to unambiguously reach a conclusion about the entities represented by the entity descriptors. In some embodiments, ID-matching algorithms 154 may not be used.

Relationship queries 170 of various types may be directed to the relationship analyzer 150 via programmatic interfaces 172 in different embodiments. In some embodiments, for example, an ad-hoc query indicating a small number of entity descriptor pairs, or a single entity descriptor pair comprising a source entity descriptor and a target entity descriptor may be received. The relationship query may also indicate, in various embodiments, the kind of relationship for which a score is to be obtained—e.g., whether a similarity score is desired with respect to a specified set of attributes or all attributes, a difference score with respect to a specified set of attributes or all attributes is desired, an inclusion score is desired, a participation score is desired, and so on. In other embodiments, a bulk query indicating thousands or millions of source and target items may be submitted. In at least some embodiments, one or more instances of replicas of the trained deep neural network model 152 may be used to generate respective relationship indicators 180 corresponding to each pair of {source, target} entity descriptors. The scores may be binary in some embodiments (e.g., in the case of similarity scores, with a "1" indicating a high probability of a match or a certainty of a match, and a "0" indicating a low probability of a match) or may take on a range of values (e.g., in the case of similarity scores, real numbers between 0 and 1 indicating estimated probability of a match) in other embodiments.

In the depicted embodiment, the relationship indicators such as similarity scores may be transmitted or provided to one or more relationship indicator consumers, which may for example include the submitter of the similarity query, automated item catalog management or inventory management systems, pricing systems, retail website management systems, and the like. A catalog or inventory management system may, for example, use an indication of a dissimilarity between a particular pair of items I1 and I2, where source item I1 is already in the catalog of a retailer, to initiate a process for ordering items I2 (which may be absent from the catalog) in some embodiments. A pricing system may, for example, initiate the process of determining whether the current price of an item I3 should be changed, in view of a different price being charged for the same item I4 elsewhere in some embodiments. A retail website management system may, for example, in some embodiments determine whether the "details" pages of items I1 and I2 should be made identical, even if the suppliers of the items provided different content for the details pages, if the two item descriptors of a pair are deemed to refer to the same underlying item. In at least one embodiment, the relationship indicators scores may be stored, e.g., in a repository of the machine learning service, and may not necessarily be transmitted to a destination.

As mentioned earlier, much of the following description, especially in the context of FIG. 2-FIG. 11, is focused on item-level similarity analysis by way of example. In this part of the description, the term "item" may be used as instead of "entity" (e.g., descriptors may be referred to as "item descriptors" rather than the more general "entity descriptors"), and the term "similarity analysis" may be used instead of the term "relationship analysis". Similar techniques to those described in the context of FIG. 2-FIG. 11 may be applied in various embodiments to perform relationship analysis along various dimensions other than similarity (such as difference, inclusion, participation etc.) and for various types of entities which may not always correspond to individual items (such as groups of items, brands, categories, individuals etc.)

Model Overview

Figure 2:
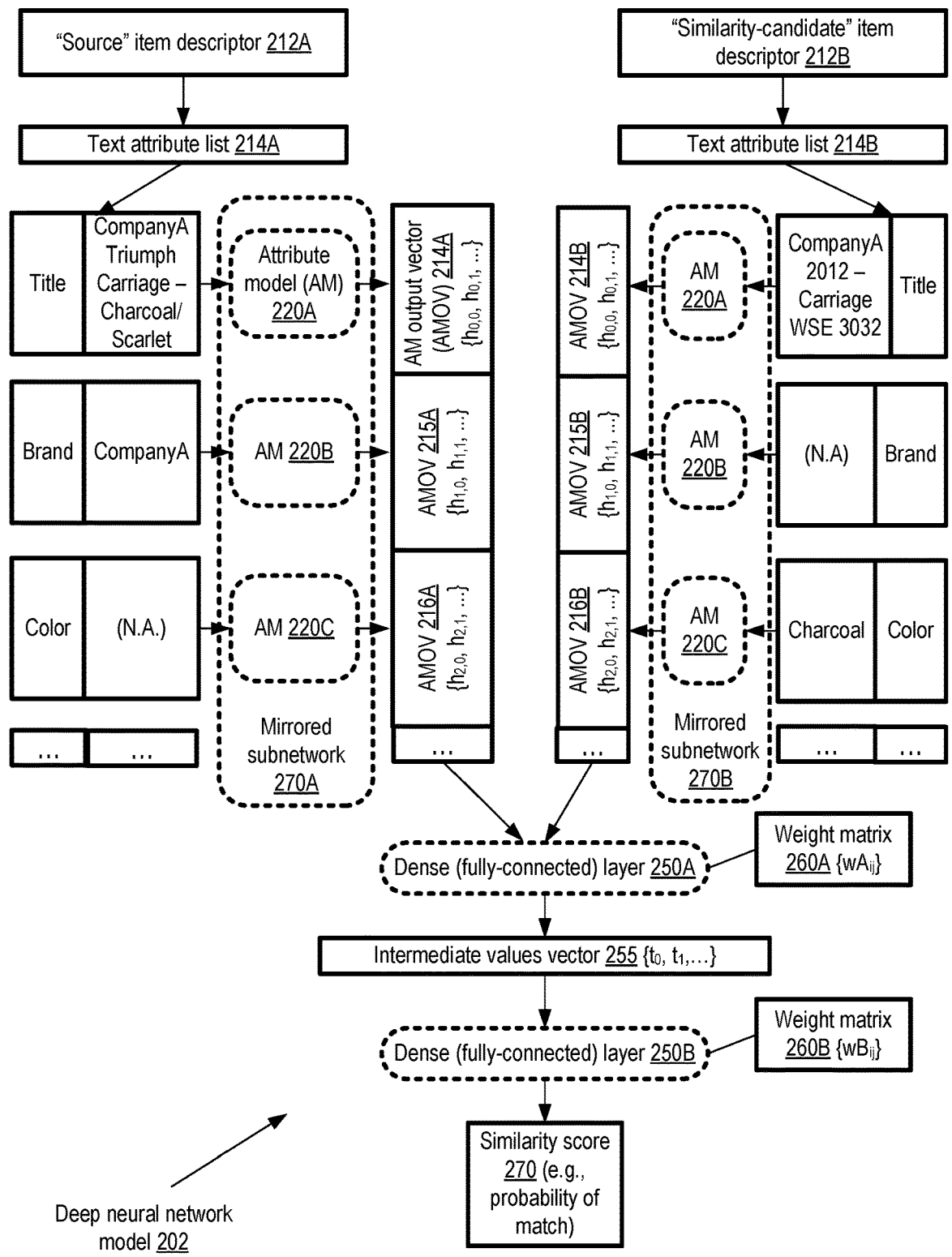
FIG. 2 illustrates an overview of a deep neural network model with mirrored or "Siamese" subnetworks which may be used for item similarity analysis, according to at least some embodiments.

FIG. 2 illustrates an overview of a deep neural network model with mirrored or "Siamese" subnetworks which may be used for item similarity analysis, according to at least some embodiments. In the depicted embodiment, mirrored subnetworks 270A and 270B at the attribute model layer of deep neural network model 202 are shown. As discussed below in further detail, the attribute model layer subnetworks may comprise respective token model layer subnetworks which are also mirrored; the token model details are not shown in the overview depicted in FIG. 2.

To simplify the presentation, a source item descriptor 212A and a corresponding similarity-candidate item descriptor 212B, each comprising a respective set or list of text attributes (e.g., list 214A of source item descriptor 212A, and list 214B of similarity-candidate item descriptor 212B) are shown in FIG. 2. The types of attributes included in lists 214A and 214B are assumed to be identical in the depicted scenario, although in at least one embodiment one of the item descriptors may have a different list of attributes than the other. Three examples of attribute types are shown by way of example in FIG. 2: a "Title" attribute, a "Brand" attribute, and a "Color" attribute.

The source and similarity-candidate item descriptors in the depicted example refer to the same underlying item, a baby carriage or stroller. The "Title" attribute of item descriptor 212A comprises the text "CompanyA Triumph Carriage—Charcoal/Scarlet", while the "Title" of item descriptor 212B is set to "CompanyA 2012—Carriage WSE 3032". The "Brand" attribute of descriptor 212A comprises the text "CompanyA", while the "Brand" attribute of descriptor 212B is empty (as indicated by the label "N.A" or "not available"). The Color attribute of descriptor 212A is empty, while the Color attribute of descriptor 212B comprises the text "Charcoal" in the depicted example.

The raw text of the attributes may be processed and converted into a set of intermediate vectors by a token model layer (not shown in FIG. 2) in the depicted embodiment, which are then consumed as input by nodes of respective mirrored instances of attribute model subnetworks 220 (e.g., 220A, 220B, 220C, and so on). Individual ones of the attribute model subnetworks 220 may comprise a plurality of nodes, including for example LSTM units as discussed below in at least some embodiments. Corresponding to a given attribute's value, an attribute model output vector (AMOV) may be generated in the depicted embodiment. For example, AMOVs 214A and 214B (each comprising a respective vector of real numbers $h_{0,0}$, $h_{0,1}$, . . . ) may be produced from the "Title" attributes of descriptors 212A and 212B, AMOVs 215A and 215B may be generated from the "Brand" attributes, AMOVs 216A and 216B may be generated from the Color attributes, and so on.

In at least some embodiments, the AMOVs may be combined (e.g., by concatenation) and provided as input to a first dense or dully-connected layer 250A of the deep neural network 202, for which a first weight matrix 260A may be learned during training. The output of the first dense layer 250A may comprise another intermediate values vector 255 in the depicted embodiment, which may in turn comprise the input to a second dense layer 250B with associated weight matrix 260B. The output of the second dense layer 250B may comprise the similarity score 270 (e.g., a real number or integer indicating the probability that the items represented by item descriptors 212A and 212B are the same items) in the depicted embodiment.

In some embodiments, for example to avoid overfitting, a dropout technique may be employed at one or more layers of the deep neural network model, whereby randomly selected neurons or nodes of the model are ignored during training. A dropout parameter may represent the probability than a given node is to be ignored or "dropped out" in such embodiments, and may be included in the set of hyper-parameters for which values may be identified before a given training iteration of the model. If a node is dropped out, in some embodiments its contribution to the activation of downstream nodes may be at least temporarily removed on the forward pass, and/or weight updates may not be applied to the node on the backward pass.

In various embodiments, respective data structures or objects may be allocated in memory at one or more computing devices to represent neurons or nodes of each of the layers of the deep neural network model. Furthermore, portions of the memory may also be utilized to store program instructions representing the logic exercised to train and execute the model. In at least one embodiment, a neural networks library (similar to the Keras library) may be employed to implement portions or all of the deep neural network model 202. Any of a variety of programming languages such as Python, Java™, Scala or the like may be used for the neural network model in different embodiments, and the model may be trained and executed using a variety of execution platforms such as one or more physical or virtual machines.

Attribute Types

Figure 3:
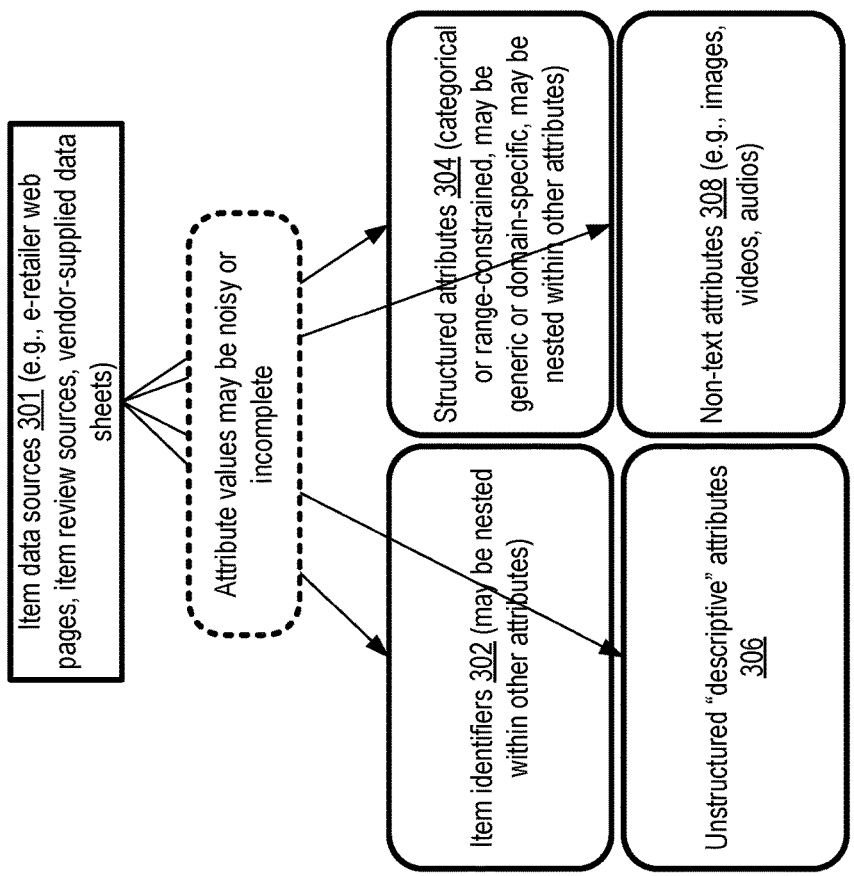
FIG. 3 illustrates examples of attribute types for which values may be available to perform item similarity analysis, according to at least some embodiments.

The complexity of the item descriptor similarity analysis problem may vary in different embodiments, e.g., depending on the types of attributes for which values are available for various items being considered and the standards or constraints (if any) which are imposed on item descriptor contents. FIG. 3 illustrates examples of attribute types for which values may be available to perform item similarity analysis, according to at least some embodiments. In the depicted embodiment, item descriptors may be obtained from a variety of sources 301, including for example e-re-tailing web sites owned/managed by a variety of operators, item review sources, vendor-supplied data sheets and the like. In at least some embodiments, few constraints may be enforceable regarding the content of attributes included in item descriptors, or even the names or types of the attributes.

In the depicted embodiment, values of at least four categories of attributes may be available with respect to various items. Unique item identifier attributes 302 may include UPCs, GTINs, EANs and the like, but the identifiers may not necessarily be provided as independent attributes—instead, for example, they may be mentioned or nested inside other attributes such as natural-language titles or descriptions. Identifiers which uniquely identify a given item may be referred to as "strong" identifiers in some embodiments. Structured attributes 304 may represent classes of attributes which can take on limited values—e.g., values within a numerical range (such as weights) or an enumerated set of categorical values such as colors. Structured attributes may be domain-specific in some cases, e.g., some items such as rental cars may be specified as belonging to a set of less than ten classes such as "economy", "standard" and the like, or food-related items may be describe using flavors selected from a set of flavors, while in other cases a structured attribute may be generic. Structured attributes may be present in un-normalized form in various embodiments—e.g., in one item descriptor, the string "12pk" may be used to indicate a 12-pack, while in another item descriptor for the same underlying item, the string "One dozen" may be used. Values of structured attributes may also be embedded within other attributes, such as unstructured descriptive attributes 306 in some embodiments. Unstructured attributes 306 may comprise arbitrary sequences of text (words, numbers, alphanumeric tokens, punctuation and the like) in various embodiments, with few or no rules imposed on the text. Deep neural network models of the kind described herein may be especially useful when item descriptors comprise unstructured attributes in various embodiments. As indicated by element 320 of FIG. 3, some or all of the attribute values available to a similarity analyzer may be noisy or incomplete in different embodiments.

In some embodiments, item descriptors may also comprise non-text attributes 308 such as images, video or audio. In at least one embodiment, image recognition algorithms, image matching algorithms, audio/video matching algorithms and the like, some of which may also employ neural network models such as convolutional neural networks (CNNs) may be used for similarity analysis of items which include non-text attributes. In some embodiments in which item attributes include text as well as non-text content, a combination of the text-analysis-based deep neural networks described above and non-text algorithms may be employed. In some embodiments, text descriptions of non-text attributes may be generated, in effect transforming non-text attributes to approximate text attributes, and a text-analysis based deep neural network may then be employed for similarity analysis.

Attribute Model

Figure 4:
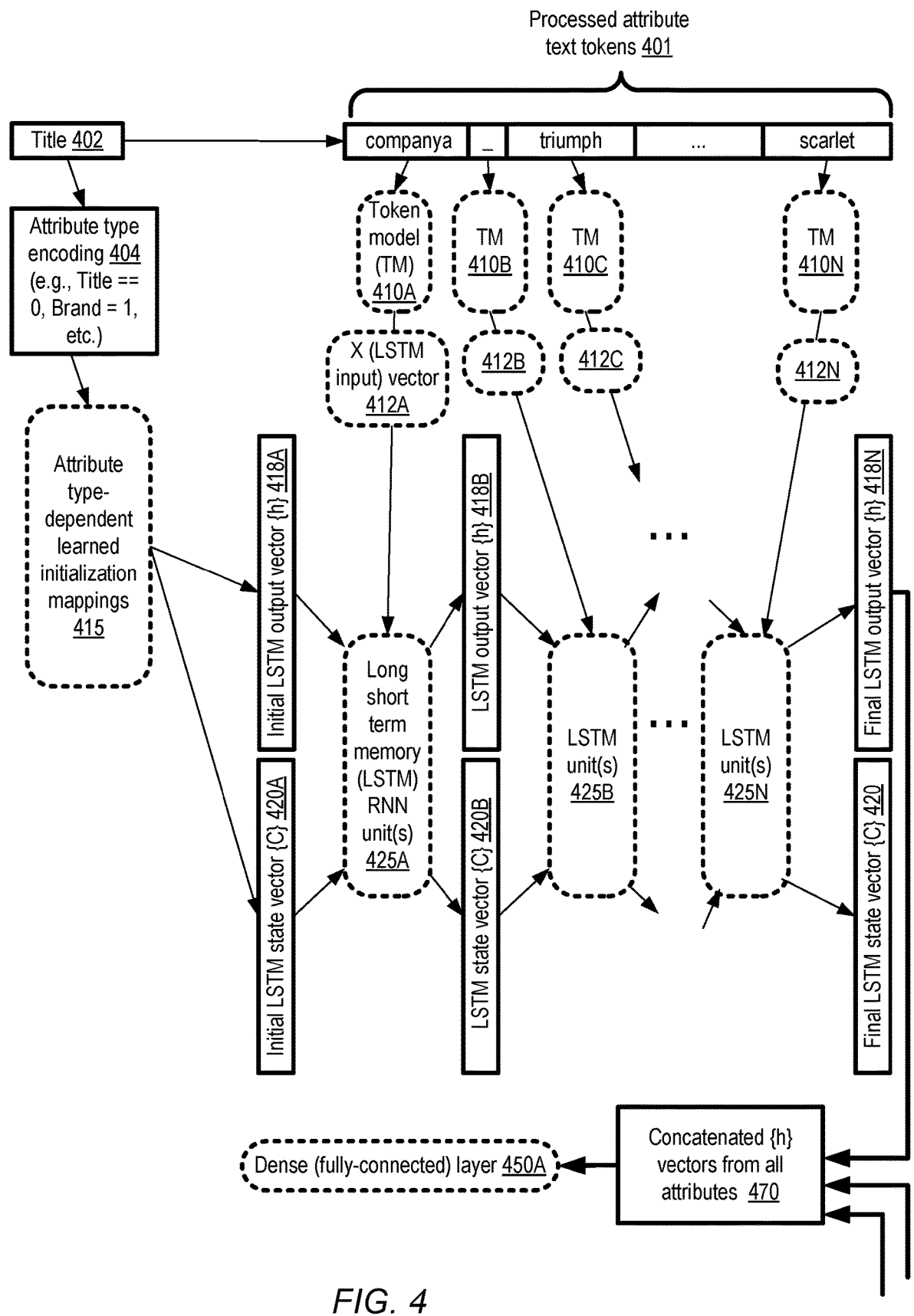
FIG. 4 illustrates an overview of an attribute model which may be used for item similarity analysis, according to at least some embodiments.

FIG. 4 illustrates an overview of an attribute model which may be used for item similarity analysis, according to at least some embodiments. In the depicted embodiment, the text content of an example attribute (Title 402) may be processed into a set of zero or more text tokens 401. Respective token model instances 410, such as 410A, 410B, and so on (details of which are provided below) may be used to produce, corresponding to the individual tokens, respective vectors 412 which can be used as inputs for LSTM units of the attribute model in some embodiments. The LSTM input vectors 412 (e.g., 412A, 412B, ...) may be labeled X vectors in some embodiments, with each token (such as the word "companya", a normalized version of the word "CompanyA" of the original or raw attribute) being represented by a selected number of real values labeled $X_0$, $X_1$, and so on. In the depicted embodiment, respective instances of the same common attribute model subnetwork may be used for all the attributes. In other embodiments, different attribute models may be used for different attributes—e.g., a "Title" attribute model with a first arrangement of artificial neurons may be used for "Title" attribute contents, a "Brand" attribute model with a different arrangement of artificial neurons may be used for "Brand" attribute contents, and so on.

In the depicted embodiment, even though the same common attribute model is used for the different attributes of an item descriptor pair, the initialization of the attribute model instance may be attribute-type-dependent. For example, values of the entries in initial LSTM state vector {C}, labeled 420A, and values of the entries on initial LSTM output vector {h}, labeled 418A, may be obtained using attribute type-dependent learned initialization mappings 415 in the depicted embodiment. In at least some embodiments, different values of respective state variables (e.g., elements of the {C} vector) may be chosen for different attribute types. An attribute type encoding value 404 (e.g., a value of 0 for the "Title" attribute type, 1 for the "Brand" attribute type, and so on) may be used for the initialization mapping in the depicted embodiment.

The initial LSTM state vector 420A, the initial LSTM output vector 418A and the token model output vector 412A corresponding to the first token of the attribute (the normalized string "companya" of the "Title" attribute in the depicted example) may form the input to a first LSTM unit 425A in the depicted embodiment. Details of the internal organization of a given LSTM unit which may be employed in some embodiments are provided below in the context of FIG. 5. The output of the first LSTM unit 425A, which may comprise state vector 420B and output vector 418B, together with the token model output vector 412B corresponding to the next token of the attribute (a space in the depicted example), may be provided as input to the second LSTM unit 425B of the attribute model layer in the depicted embodiment. Similarly, the outputs of each successive LSTM unit 425, together with the token model output vector of the next token, may be included in the input of the next LSTM unit, and so on. The final LSTM output vector 418N generated at LSTM unit 425N for the "Title" attribute in the depicted example may be combined or concatenated with other output vectors generated with respect to other attributes, as indicated in element 470, and provided as input to a dense layer 450A of the deep neural network model. (The final LSTM output vector 418N of FIG. 4 may correspond to one of the AMOVs shown in FIG. 2, such as AMOV 214A, which is similarly combined with other AMOVs to form the input to dense layer 250A of FIG. 2). As a result of the use of LSTMs in the attribute model, representations of the sequencing of individual tokens (the position at which different tokens appear within attributes) may be incorporated in the deep neural network in various embodiments. Thus, for example, if one attribute value A1 for a given item descriptor D1 comprises a particular word W1 as the first token, and another attribute A1' for the item descriptor being compared to D1 comprises W1 as its $50^{th}$ token, the relative positioning of W1 in A1 and A1' may be taken into account in the deep neural network model—for example, because W1 appears later in A1' than in A1 relative to most of the other tokens/words, W1's relative importance may be interpreted as lower in A1' than in A1.

LSTM Units

Figure 5:
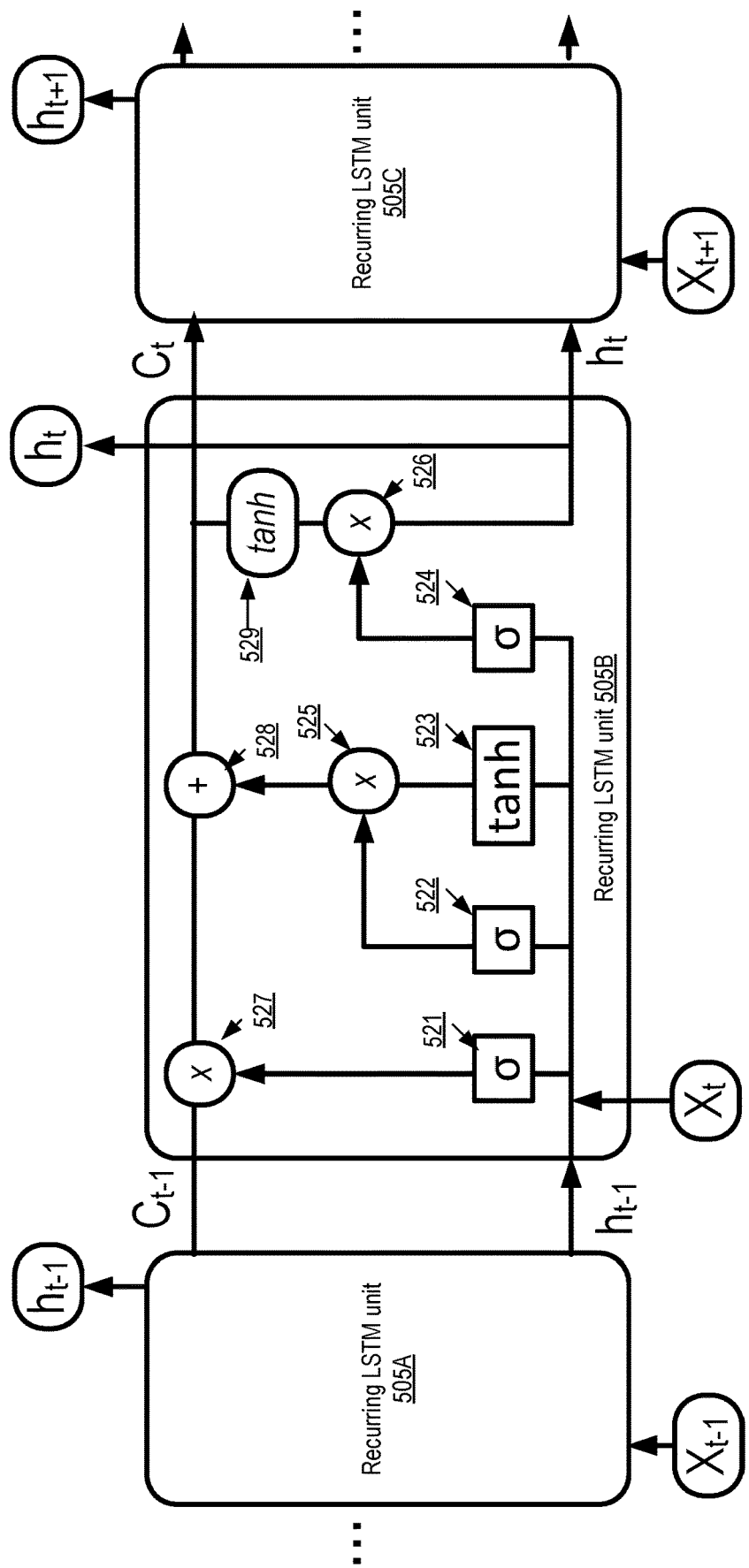
FIG. 5 illustrates an example architecture of a recurring Long Short Term Memory unit of a neural network model, according to at least some embodiments.

FIG. 5 illustrates an example architecture of a recurring Long Short Term Memory unit of a neural network model, according to at least some embodiments. It is noted that the architecture shown in FIG. 5 may not necessarily be used in some embodiments for the attribute models of a neural network used for item similarity; instead, other recurrent neural network units or modules such as variants of LSTMs may be employed.

As also indicated in FIG. 4, multiple LSTM units or modules may be chained in individual subnetworks (such as the mirrored subnetworks of the attribute model layer) in some embodiments. In the depicted example architecture shown in FIG. 5, details of the internal organization of one recurring LSTM unit 505B are displayed; the other LSTM units 505A may be assumed to have similar internal structures.

Each LSTM unit may consume as input an input vector $X_t$ (where the index label t represents a sequence of time steps or elements of a series) comprising one or more elements, and produce a respective output vector $h_t$ comprising one or more elements. Thus, the inputs of the units LSTM 505A, 505B and 505C comprise the respective vectors $X_{t-1}$, $X_t$, and $X_{t+1}$, and the outputs of the LSTM units 505A, 505B and 505C comprise the respective vectors $h_{t-1}$, $h_t$ and $h_{t+1}$. A state C is associated with each of the units—e.g., state $C_{t-1}$ represents the state of unit 505A, while $C_t$ represents the state of unit 505B in the depicted embodiment.

Within each LSTM unit 505, four groups of artificial neurons or nodes may be configured in the depicted embodiment, corresponding to elements 521, 522, 523 and 524 of FIG. 5. In each LSTM unit, information may be added to or removed from the state C, regulated by three structures which may be referred to as respective gates. Individual gates may comprise, for example, a sigmoid neural network layer (such as 521, 522, or 524) and one or more pointwise multiplicative operations (such as operations represented by elements 527, 525, or 526 respectively). A sigmoid neural network layer may output numerical values between 0 and 1, controlling how much of each of its inputs is to be included in its output(s).

The first of the three gates of the LSTM unit 505B in the depicted embodiment comprises sigmoid layer 521 and multiplicative operation 527, and may be referred to as the "forget gate". In effect, in the forget gate, based on $h_{t-1}$ and $X_t$, a respective value between 0 and 1 may be produced, corresponding to each element of the state $C_{t-1}$ vector, and then multiplied with that element of $C_{t-1}$. "Input gate" sigmoid layer 522 may be used to identify various elements of the input $h_{t-1}$ and $X_t$ which are multiplied with the output of a tan h layer 523 (at multiplicative operation 525) and added to the state information using pointwise addition operation 528. Sigmoid layer 524 of an "output gate" (which also takes $h_{t-1}$ and $X_t$ as input) and tan h operation 529 (applied to the modified state information $C_t$) collectively determine the output $h_t$ of the LSTM unit 505B. Respective sets of weights may be learned for each of the four neural network layers 521, 522, 523 and 524 during training in various embodiments.

Text Token Model

Figure 6:
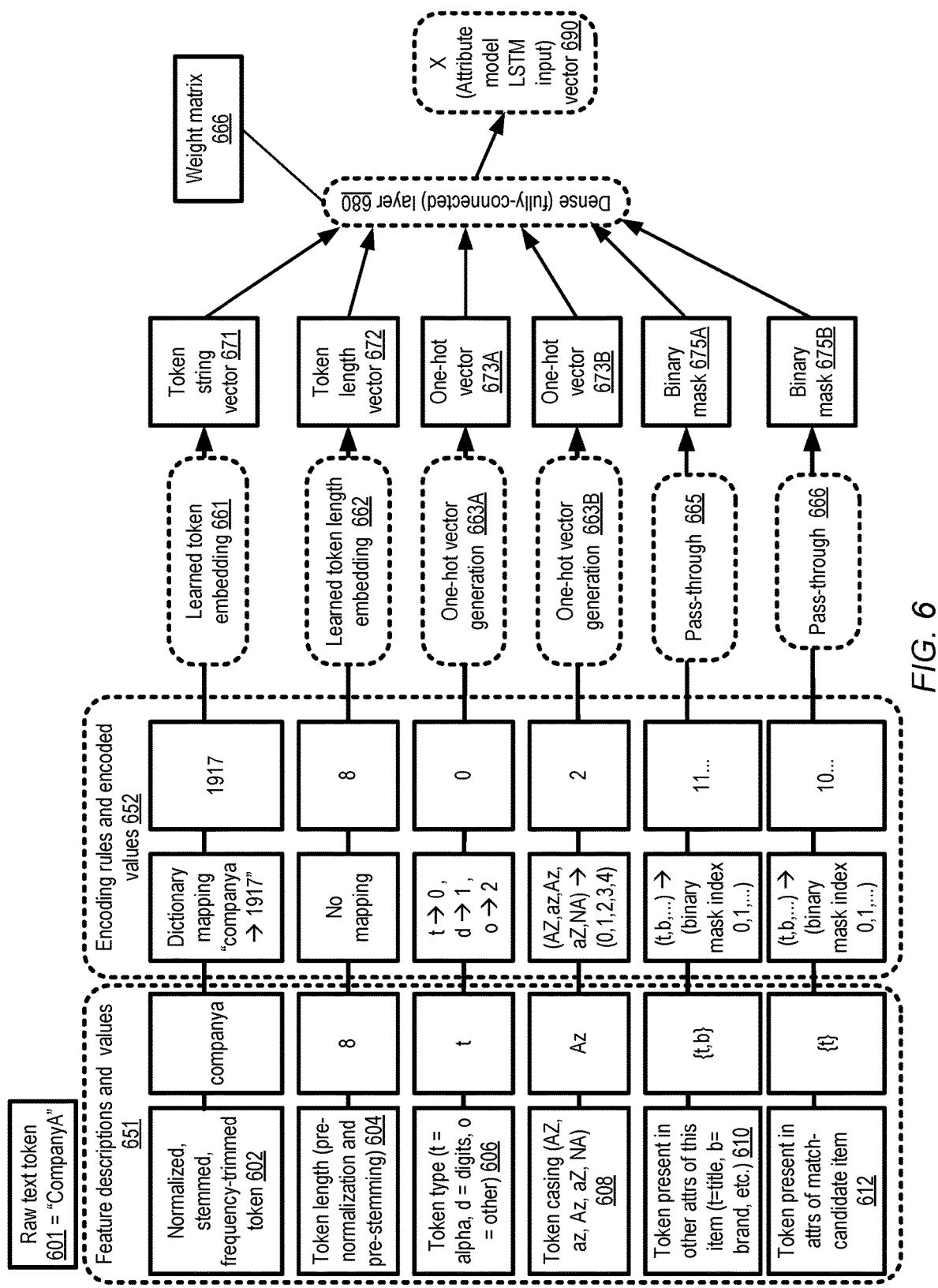
FIG. 6 illustrates an overview of a text token model which may be used for item similarity analysis, according to at least some embodiments.

FIG. 6 illustrates an overview of a text token model which may be used for item similarity analysis, according to at least some embodiments. Example feature extraction and encoding operations of the token model, as well as learning operations which may be performed to generate the inputs of the attribute model layer, are indicated according to one embodiment in FIG. 6. The operations are presented with respect to a particular raw text token 601 comprising the string "CompanyA", which may represent part of an attribute of an item descriptor of a given pair of item descriptors being analyzed during training or execution of the deep neural network model in the depicted embodiment.

The raw token "CompanyA" may be normalized, stemmed and frequency-trimmed in the depicted embodiment, resulting in the transformed all-lower-case token "companya" as indicated by element 602 of feature descriptions and values 651. In a frequency-trimming operation, in some embodiments only those tokens which occur within one or more training data sets at a frequency higher than a threshold may be retained, e.g., in a dictionary generated for token embedding in the similarity analysis, while those tokens which occur less frequently may be discarded from further analysis. The threshold for inclusion in the dictionary may represent another hyper-parameter of the deep neural networking model in the depicted embodiment. In the depicted example scenario, the token "companya" meets the threshold for retention, and is mapped to a numerical value "1917" as indicated in encoding rules and values 652. The value 1917 may be used as input for a learning module for token embedding 661, producing a token string vector 671 as output. Token string vector 671 may be consumed as input (together with various other vectors indicated in FIG. 6) by a dense or fully connected layer 680 of the token model in the depicted embodiment.

The length (number of characters) of the pre-normalization token may also be represented in a feature of the token model in the depicted embodiment, as indicated by element 604. The 8-character length of the token "CompanyA" may be transformed into a token length vector 672 by learned token length embedding layer 662 as shown.

The token model may include a feature representing the token type—e.g., with three types being considered, including text-only or "t" type, digits-only or "d" type, and an other or "o" type (which may for example be used for spaces, punctuation, and/or other non-alphanumeric types). The token type 606 of "companya" may be set to "t", and mapped to the numeric value 0 (with 1 being used for "d" tokens and 2 being used for "o" tokens) as shown in encoding rules 652 in the depicted embodiment. The encoded value zero may be provided as input to a one-hot vector generator 663A, which may for example generate the vector {1,0,0} 673A indicating that the $0^{th}$ bit of 3-bit vector is set (the $0^{th}$ bit may be selected because the type "t" is mapped to 0).

The case (e.g., the ordering and mix of lower and upper case characters) of the original token "CompanyA" may be encoded using a token casing feature 608 in the depicted embodiment. The casing category label "Az" may be used to indicate a token whose first letter is in upper case and at least some remaining letters are in lower case, category label "AZ" may be used to indicate a token which consists entirely of upper case characters, and so on. Five numerical values {0, 1, 2, 3, 4} may be used to represent respective ones of the casing categories. In the depicted embodiment, the casing category label for "CompanyA" is set to "Az", and mapped to the numerical value "2". A 5-element one-hot vector 673B may be generated representing the "Az" designation of "CompanyA" using vector generator 663B.

In the token model used in the depicted embodiment, the occurrences of a given token (when considered in its post-normalization, post-stemming form) within other attributes of the same item descriptor may be represented by a feature implemented as a bit vector or binary mask 675A. As indicated in feature description 610, each of the attribute types of the item descriptor may be assigned a particular label and a corresponding index in a bit vector in at least some embodiments: e.g., the letter "t" may be used as a label for the "Title" attribute, and may be assigned the $0^{th}$ element of the bit vector, the letter "b" may be used as a label for the "Brand" attribute and assigned the $1^{st}$ element of the bit vector, and so on. Because the normalized token string "companya" occurs in both the "Title" and the "Brand" attributes of the item descriptor in the depicted scenario, an intermediary feature {t,b} may be created and then mapped to the binary mask encoding {11 . . . } which may be passed through without modification to the dense layer 680 as indicated by element 665. In the depicted embodiment, the "1"s in the binary mask indicate the particular attributes in which "companya" is present (the "Title" and the "Brand") while the "0"s indicate the attributes in which "companya" is absent. In other embodiments, the reverse mapping may be used, with "0"s indicating presence and "1"s indicating absence of the token. The binary mask 675A may be used to capture information about tokens that may be repeated among several attributes of an item descriptor in various embodiments, which may at least in some cases indicate the potential importance of the token.

In at least some embodiments, another binary mask 675B may be generated to indicate the attributes (if any) of the second item descriptor within which the token appears. A similar labelling technique may be used for the attributes of the similarity-candidate item descriptor, and the labels may be encoded using a binary mask encoding. For example, because "company" appears only in the "Title" attribute in the depicted scenario, the initial feature corresponding to definition 612 may comprise {t}, which may be mapped to the binary mask {10 . . . } and passed through without modification to the dense layer 680 as indicated by element 666. The binary mask 675B may be used to capture information about tokens that are common to the two item descriptors being considered in various embodiment, even if the tokens appear in different attributes in the two descriptors. Features such as the binary masks 675A and 675B may be especially important with respect to retaining information about relatively infrequent tokens (which may have been filtered out due to their infrequent occurrences from a dictionary of tokens whose embedding values are learned using element 661 of FIG. 6) in various embodiments. In some embodiments, Jaccard similarity measures between two item descriptors may be obtained with the help of binary masks or bit vectors similar to 675B.

Based on the input vectors 671, 672, 673A, 673B, 675A and 675B, weights of weight matrix 666 of the dense neural network layer 680 may be learned during training of the model. The dense layer 680 may produce, as its output with respect to a given token such as "CompanyA", an X vector 690 which is used as one of the inputs to an LSTM unit of the attribute model layer in the depicted embodiment. In some embodiments, additional features not shown in FIG. 6 may be included in the token model. In at least one embodiment, one or more of the features shown in FIG. 6 may not be used in a token model. In one embodiment, the machine learning service may implement programmatic interfaces enabling clients to extend and/or modify the token model, e.g., by providing new feature definitions and mappings from feature values of the newly-defined features to vectors that are provided as inputs to one or more layers of the deep neural network model.

Detailed Example of Text Token Model Features

Figure 7:
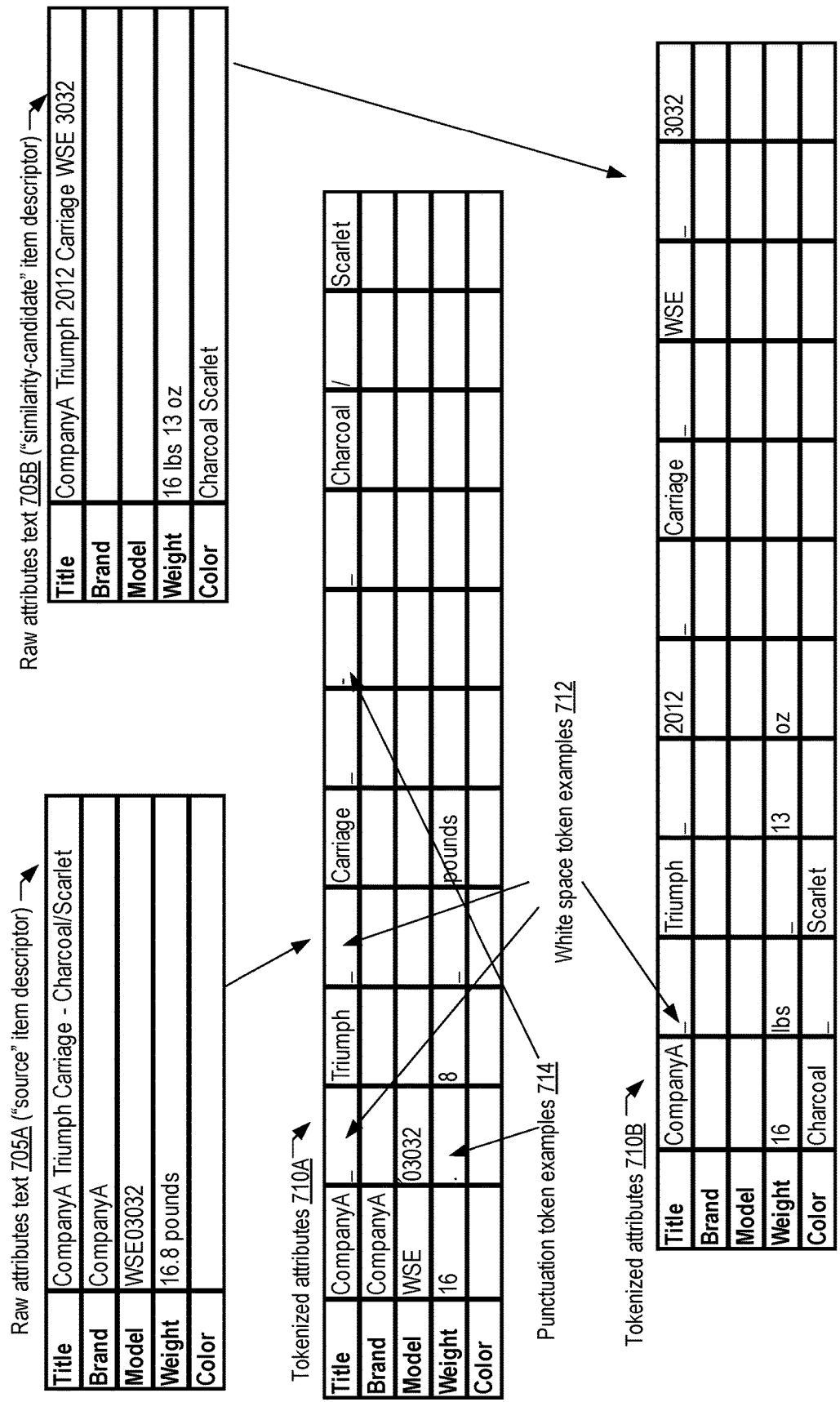
FIG. 7 illustrates examples of tokens which may be generated from raw text item descriptors, according to at least some embodiments.

FIG. 7-FIG. 11 collectively illustrate, for a given set of raw text attribute values of a pair of item descriptors, steps involved in generating token features from which respective input vectors (similar to vectors 671, 672, 673A, 673B, 675A and 675B of FIG. 7 6) for an attribute model may be produced. FIG. 7 illustrates examples of tokens which may be generated from raw text item descriptors, according to at least some embodiments. In the depicted example, raw text input 705A comprises values of five attributes types ("Title", "Brand", "Model", "Weight" and "Color") for a source item descriptor, while raw text input 705B comprising values of the five attribute types for a similarity-candidate item descriptor. As illustrated, some attributes may have no raw text values assigned to them in the depicted embodiment—e.g., the "Color" attribute is empty for the source item descriptor, while the "Brand" and "Model" attribute values are empty for the similarity-candidate. Respective pairs of tables showing intermediate processing results and/or features derived from the raw text 705A and 705B for the two item descriptors are shown in FIG. 7-FIG. 11.

In an initial processing step, a set of tokenized attributes may be extracted from the raw text of each item descriptor in some embodiments—e.g., tokenized attributes 710A may be extracted from the raw text 705A of the source item descriptor, while tokenized attributes 710B may be extracted from the raw text 705B of the similarity-candidate item descriptor. The tokenized attributes may include, for example, text-only tokens such as the words "CompanyA", "Charcoal", "Scarlet" and the like, numeric-only tokens such as "03032", "3032" etc., white space tokens 712 representing spaces between successive non-whitespace characters, and/or punctuation tokens 714 in the depicted embodiment. The algorithms used to generate tokens from the raw text may differ from one embodiment to another—e.g., in some embodiments, a sequence of one or more alphabet characters followed by one or more numeral may not necessarily be split into two tokens (as is done in the case of raw text "WSE03032" in the depicted example, which is split into tokens "WSE" and "03032"). In at least one embodiment, instead of generating white space tokens, white space may be ignored.

FIG. 8 illustrates examples of token model feature values which may be obtained by normalization and stemming of tokens, and by determining token lengths, according to at least some embodiments. For example, normalized, stemmed and frequency-trimmed token feature values 810A may be generated from tokenized attributes 710A of FIG. 7, while normalized, stemmed and frequency-trimmed token feature values 810B may be extracted from tokenized attributes 710B of FIG. 7. During the operations performed to obtain the feature values 810A and 810B, upper case letters may be converted to lower case letters (as in the transformation "CompanyA" to "companya" or "WSE" to "wse"), plural indicators such as the "s" in "pounds" or "lbs" may be removed as part of the stemming procedure, the leading zero may be removed from "03032" and so on. In frequency trimming, a decision as to whether a token should be retained for further feature processing may be made based on the total number of occurrences of the token within one or more data sets in various embodiments; in the depicted example, all the tokens meet this minimum threshold and are retained. Table 815A indicates the token length feature values generated for the source item descriptor, while table 815B indicates the token length feature values for the similarity-candidate item descriptor. The lengths of the tokens as they existed prior to the normalization and stemming may be used for the token length features: for example, the length of the word "pounds", which is 6 letters, is used instead of the length of the stemmed word "pound" in Table 815A, as indicated by label 817.

FIG. 9 illustrates examples of token model feature values which may be obtained by taking token data types and case information into account, according to at least some embodiments. Continuing with the example source item descriptor discussed in the context of FIG. 7 and FIG. 8, token data type feature values 910A may be generated for the source item descriptor, while token data type feature values 910B may be generated for the similarity-candidate item descriptor. The codes "t", "d" and "o" may represent text-only, digits-only and other types of tokens such as punctuation or white space tokens (with the normalized versions of the tokens being considered for these features). For example, "companya" is represented by a "t", "3032" is represented by a "d", and "/" and "_" (white space) are each represented by "o" in tables 910A and 910B.

To capture case information for the pre-normalization versions of the text-only tokens, the following codes may be used in the depicted embodiment. "AZ" may represent all-upper-case tokens, "az" may represent all-lower-case tokens, "Az" may represent tokens that begin with an upper-case letter and include at least one lower-case letter, "aZ" may represent tokens that begin with a lower-case letter and contain at least one upper-case letter, and "NA" (not applicable) may be used to represent non-text tokens. Thus, for example, in table 915A corresponding to the source item descriptor, "CompanyA" is represented by "Az", "WSE" is represented by "AZ", and so on. Similarly, in table 915B corresponding to the similarity-candidate item descriptor, "lbs" and "oz" are represented by "az".

FIG. 10 illustrates examples of token model feature values which may be obtained by determining the set of attributes, within a given item descriptor, in which a particular token is present, according to at least some embodiments. Table 1010A repeats the normalized tokens of the source item descriptor shown earlier in Table 810A, while Table 100B repeats Table 810B. Table 1015A encodes information about the occurrences, within various attributes of the source item descriptor, of each (normalized) token identified in any of the attributes. Thus, the token "companya" appears in the "Title" attribute in Table 1010A, and also in the "Brand" attribute. Accordingly, the alphabetic code "tb" is generated to represent these two attributes in which "companya" occurs, as indicated by label 1020A. As shown, the alphabetic code for each token may be further transformed into a binary mask or bit vector comprising 5 bits, in which the $0^{th}$ bit corresponds to "t" or "Title", the $1^{st}$ bit corresponds to "b" or "Brand", the $2^{nd}$ bit corresponds to "m" or "Model", the $3^{rd}$ bit corresponds to "w" or "Weight", and the final bit corresponds to "c" or "Color". Thus, the binary mask representation of "tb" is "11000" in the depicted example, with the bits for "t" and "b" set to "1" and the remaining bits set to "0". Since the "_" or white space token occurs in the "Title" and in the "Weight" attributes of the source item descriptor, the alphabetic code "tw" and binary mask "10010" may be generated for it, as indicated by label 1020B. Similarly, since the white space token occurs in the "Title", "Weight" and "Color" attributes in the case of the similarity-candidate item descriptor whose tokens are shown in Table 1010B, the alphabetic coding "twc" and binary mask "10011" may be generated for it in Table 1015B.

Figure 11:
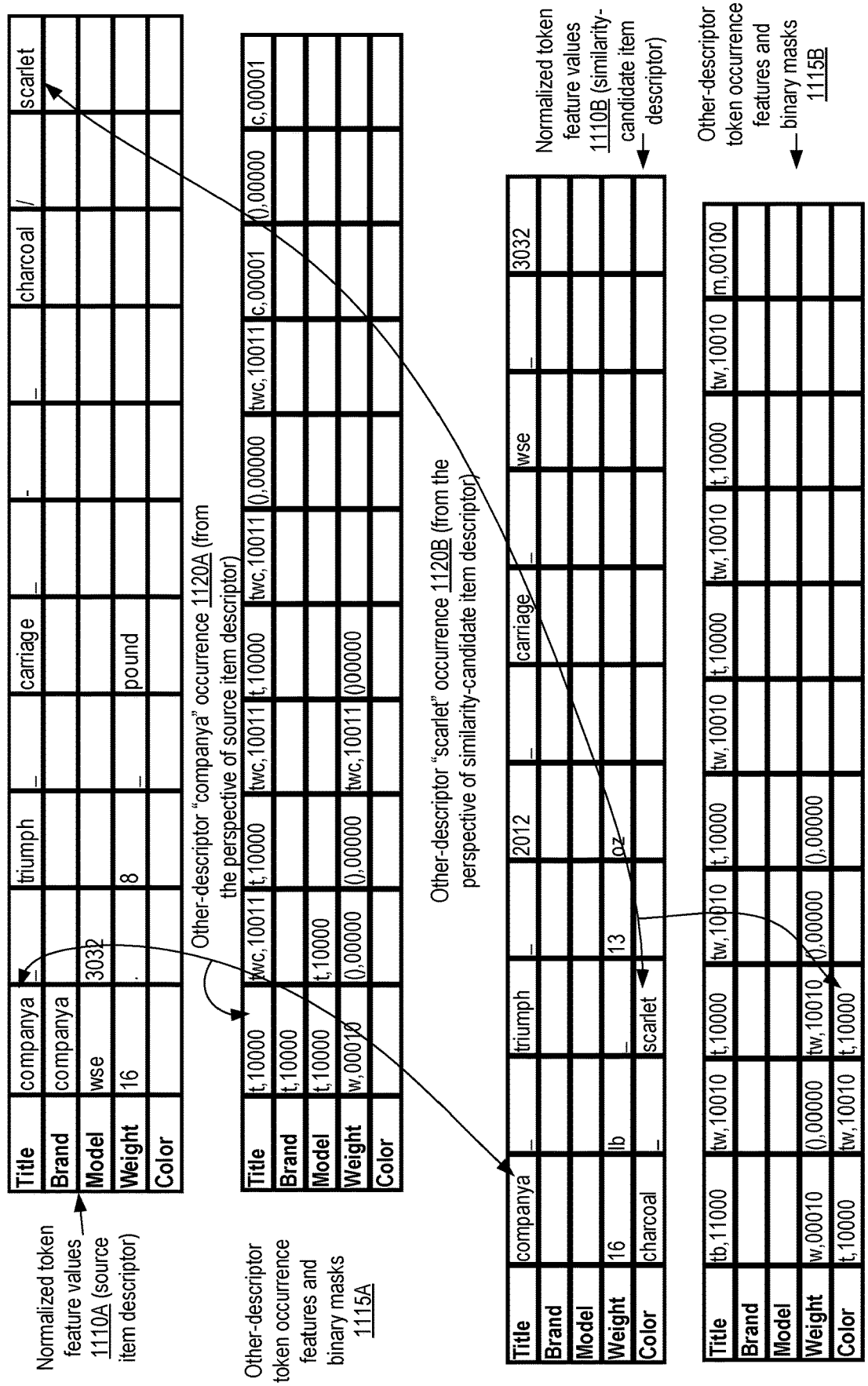
FIG. 11 illustrates examples of token model feature values which may be obtained by determining the set of attributes, in a similarity-candidate item descriptor, in which a particular token is present, according to at least some embodiments.

To capture information about the occurrences of tokens in attributes of both item descriptors, similar features may be generated in at least some embodiments. FIG. 11 illustrates examples of token model feature values which may be obtained by determining the set of attributes, in a similarity-candidate item descriptor paired with a given source item descriptor, in which a particular token is present, according to at least some embodiments. Tables 1110A and 1110B duplicate the contents of tables 1110A and 1110B respectively in FIG. 11. The same encoding techniques that were used for same-descriptor occurrence encoding (e.g., "t"="Title", etc.) in FIG. 10 may also be used for other-descriptor features shown in FIG. 11 in the depicted embodiment. With respect to each token that occurs in each attribute in Table 1110A, the tokens of various attributes represented in Table 1110B may be examined to identify occurrences of the same token. Thus, from the perspective of the source item descriptor, when the token "companya" is processed in the "Title" attribute, various attributes of Table 1110B may be searched for occurrences of "companya", and because "companya" only occurs in the "Title" attribute of Table 1110B, the alphabetic code "t" and the binary mask "10000" may be generated in the other-descriptor token occurrence feature table 1115A, as indicated by label 1120A. Note that, from the perspective of the similarity-candidate item descriptor, the code "tb" and the binary mask "11000" may be generated in Table 1115B for the token "companya", since "companya" occurs in both the "Title" and "Brand" attributes of table 1110A. In another example, the token "scarlet" occurs only in the "Color" attribute of Table 1110B, and only in the "Title" attribute of Table 1110A. Accordingly, in Table 1115A, the combination "c", "00001" is generated, while in Table 1115B, the combination "t", "10000" may be generated for the "scarlet" token as indicated by label 1120B. Note also that some tokens of a given item descriptor may not occur at all in the other item descriptor, and may therefore be mapped to an empty alphabetic string "0" and an all-zeroes binary mask "00000" in FIG. 11 (e.g., the tokens "oz" and "pounds" only occur in one of the item descriptors). As discussed in the context of FIG. 6, the set of features generated for individual tokens may be transformed into vectors and combined in at least some embodiments to generate the input used for the attribute model LSTM units. It is noted that token feature generation and encoding techniques different from those discussed in the context of FIG. 6-FIG. 11 may be employed in at least some embodiments.

Methods for Similarity Analysis Using Deep Neural Network Model

Figure 12:
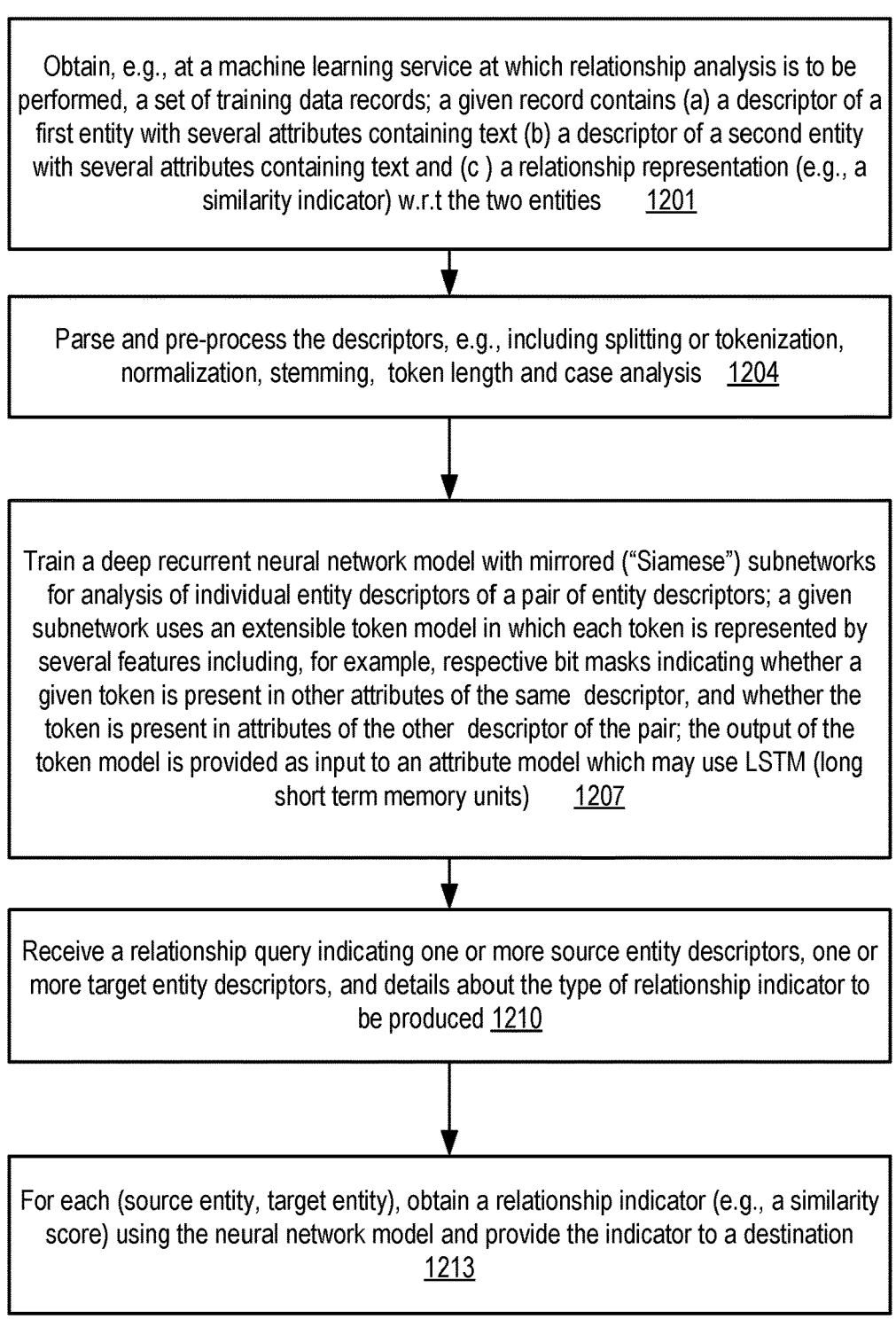
FIG. 12 is a flow diagram illustrating aspects of operations that may be performed to determine relationship indicators for entity descriptors using a deep neural network model with a multi-feature token model, according to at least some embodiments.

FIG. 12 is a flow diagram illustrating aspects of operations that may be performed to determine relationship indicators for entity descriptors using a deep neural network model with a multi-feature token model, according to at least some embodiments. As shown in element 1201, a set of training data records may be obtained in various embodiments, e.g., at a machine learning service at which relationship analysis is to be performed, or at a relationship analysis tool. Individual records of the training data set may comprise (a) a descriptor of a first entity (such as an individual item, an individual, a group of items or individuals) with several attributes containing text (b) a descriptor of a second entity with several attributes containing text and (c) a relationship representation (such as a similarity indicator or a match indicator) with respect to the first and second items. In at least some embodiments, the records may not necessarily include values for all the attributes—e.g., a "Model" or "Brand" attribute of some item descriptors may be empty, as in the examples discussed earlier. In some embodiments, components of the machine learning service may be responsible for collecting the entity descriptors from a variety of data sources—e.g., from some set of retailing web sites, from internal (with respect to the organization at which the relationship analysis is to be performed) or external databases, and the like. In at least one embodiment, the attribute values may not necessarily comply with a predefined set of rules or standards—e.g., arbitrary sequences of text may be included for various attributes. In some embodiments, the language in which text of at least some entity descriptor attributes is expressed may be translated, e.g., entity descriptors may originally be written or generated in several different countries or regions with respective languages, and an automated translation tool may be used to transform descriptors written in various languages into a single common language.

A number of different types of transformation operations to generate features which can be used for relationship analysis may be applied to the entity descriptors in some embodiments. For example, as indicated in element 1204, the text of the attributes may be parsed and processed, with the processing steps including tokenization (splitting a string representing an attribute into alphabetic words, numbers/digits, etc.), normalization (e.g., changing the case of all alphabet letters into lower case), stemming (removing common suffixes etc.), and so on in the depicted embodiment. Features representing the lengths of the individual tokens, as well as case information of the original (unmodified) tokens may be generated in at least some embodiments.

A deep recurrent neural network model with mirrored ("Siamese") subnetworks for analysis of individual entity descriptors of a pair of entity descriptors may be trained in the depicted embodiment using the generated features (element 1207). Individual subnetworks of the model may utilize an extensible token model in which each token is represented by one or more features including, for example, respective bit masks or bit vectors indicating whether a given token is present in other attributes of the same descriptor, and whether the token is present in attributes of the other descriptor of the pair as discussed above, e.g., in the examples depicted in FIG. 6-FIG. 11. In one embodiment, mirrored subnetworks may not be used. New features may be added to the token model using requests submitted via programmatic interfaces as desired in at least some embodiments—for example, a feature which takes the tense of verbs (e.g., past tense, present tense, future tense) in the raw attribute text for one or more attributes into account may be added and used for a particular relationship analysis problem. In at least some embodiments, the output of the token model may be provided as input to an attribute model which may comprise a chain of one or more recurrent neural network units, such as variants of LSTM (Long Short Term Memory) units or the like. In one embodiment, recurrent neural networks may not be used. During training of the deep neural network, a common objective function may be used for the subnetworks dealing with both descriptors of the pair in various embodiments. For example, in an embodiment in which similarity scores are being produced, an objective function based at least in part on a metric of cross-entropy loss between the similarity scores produced by the model and the similarity indicators included in the training records may be used. In various embodiments, values for a number of hyper-parameters used during training may be obtained using an automated hyper-parameter optimization service.

Relationship queries indicating one or more source entity descriptors, one or more target item descriptors and details regarding the type of relationship analysis to be performed may be received at the relationship analysis tool or machine learning service (element 1210). For example, if item-level similarity analysis is to be performed, the query may indicate that respective similarity scores (such as the probability that the same item is represented by a particular source item descriptor and a particular similarity-candidate or target item descriptor) are to be generated for various pairs of descriptors and provided to one or more destinations. Using the trained deep neural network model, a respective relationship indicator of the desired type (such as a similarity score) for various pairs of entity descriptors may be produced and provided to the destinations (element 1213) or stored in the depicted embodiment. As mentioned earlier, in some embodiments, a relationship query may indicate that a difference score (e.g., with respect to one or more specified attributes, or with respect to all attributes for which data is available) is to be obtained for a pair of entities. As such, in at least some types of relationship queries, specific attributes with respect to which the analysis is to be performed may be indicated in some embodiments. One example of a difference query may represent the logical equivalent of the following natural language question: "What is the probability that item I1 differs from item I2 in only attribute A1, with all other attributes being identical?" Another more complex example of a difference query may represent the equivalent of "What is the probability that item I1 differs from item I2 in exactly N attributes?" In one embodiment, a query may indicate that an inclusion score indicating a probability that one entity (e.g., corresponding to an individual item) of a pair of entities descriptors (e.g., in which the second entity represents a collection of items of a particular brand) is included within the other entity is to be generated. One example of an inclusion query may represent the logical equivalent of the following natural language question: "What is the probability that the brand of item I1 is B1?" (where the two entities being analyzed correspond to I1 and B1 respectively). In another embodiment, the query may indicate that a participation score indicating a probability that one entity (e.g., an actor) has participated in an activity represented by the other entity (e.g., a film or play) is to be generated. One example of a participation query may represent the logical equivalent of the following natural language question: "What is the probability that actor A1 was in film F1?" (where the two entities being analyzed correspond to A1 and F1 respectively). Other types of relationships may be analyzed and queried in various embodiments.

It is noted that in various embodiments, some of the operations shown in FIG. 12 may be implemented in a different order than that shown in the figure, or may be performed in parallel rather than sequentially. Additionally, some of the operations shown in FIG. 12 may not be required in one or more implementations.

Provider Network Environment

Figure 13:
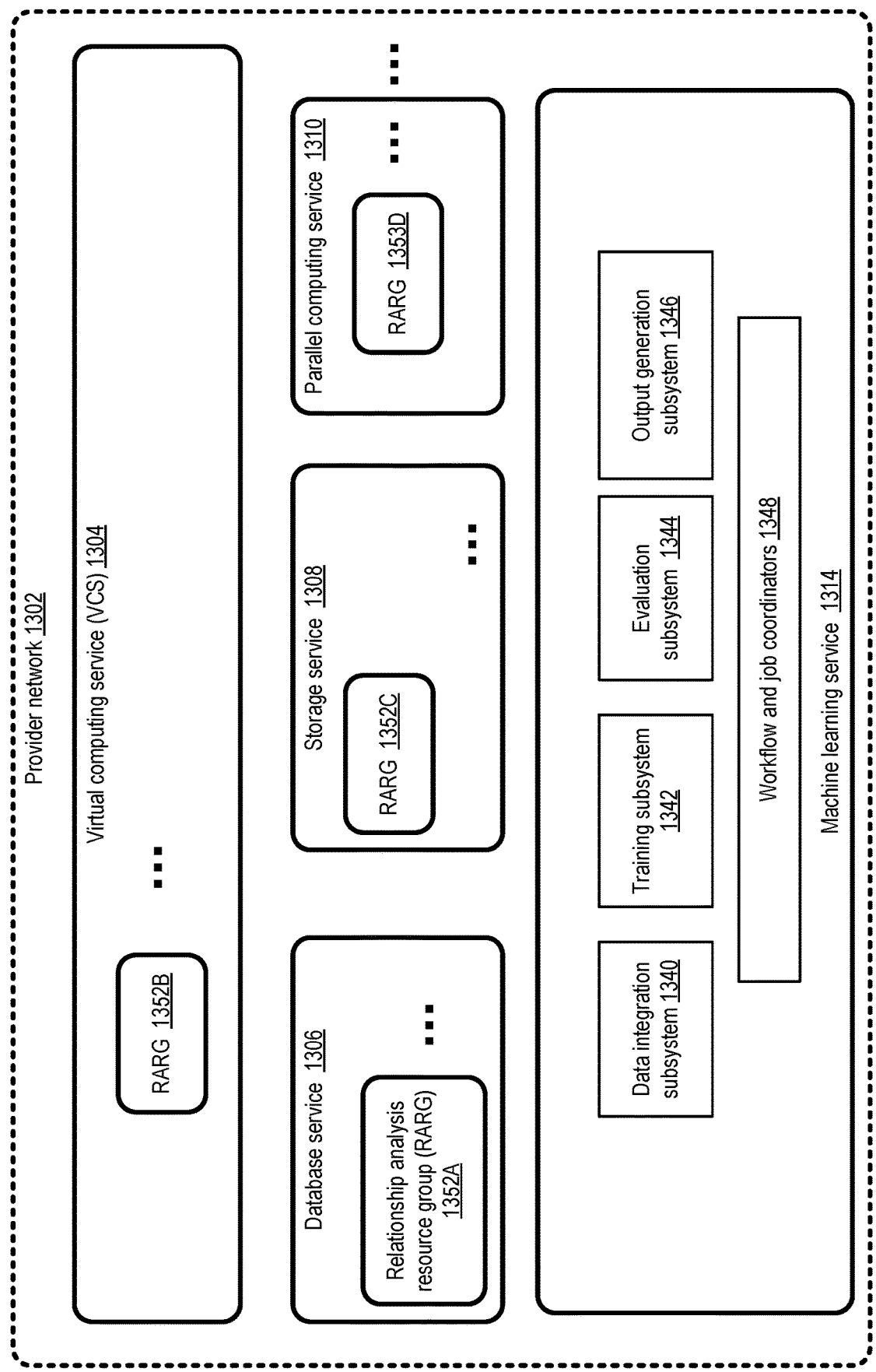
FIG. 13 illustrates examples of network-accessible services of a provider network which may be used for performing relationship analysis, according to at least some embodiments.

FIG. 13 illustrates examples of network-accessible services of a provider network which may be used for performing relationship analysis, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 1302 in the depicted embodiment may include, for example, a virtual computing service 1304, a database service 1306, a storage service 1308, a parallel computing service 1310, and a machine learning service 1314. As shown, the machine learning service 1314 may comprise one or more workflow and/or job coordinators 1348, a data integration subsystem 1340, training subsystem 1342, evaluation subsystem 1344 and an output generation subsystem 1346 in the depicted embodiment. These subsystems may collectively be used to implement workflows or pipelines of tasks associated with relationship analysis, such as collecting/aggregating training data sets at the integration subsystem, training deep neural network models at the training subsystem, and so on. Each of the services of provider network 1302 may expose respective sets of programmatic interfaces to its clients in the depicted embodiment. Some of the services of a provider network may utilize resources of other services in various embodiments. For example, with respect to a particular relationship analysis workflow, respective relationship analysis resource groups (RARGs) 1352 such as RARGs 1352A, 1352B, 1352C and 1352D of database service 1306, virtual computing service 1304, storage service 1308 and parallel computing service 1310 may be used. The database service may be used, for example, to store various relationship indicators such as similarity scores, the storage service may be used for storing the input data and various intermediate results, and the remaining two services may be used for performing various computation steps. Respective instances of a trained neural network model used for relationship analysis may be run on behalf of the machine learning service at various virtual machines (e.g., including virtual machines instantiated at hosts comprising graphics processing units or GPUs) of the virtualized computing service, e.g., in parallel, in some embodiments.

It is noted that at least in some embodiments, a machine learning service infrastructure similar to that shown in FIG. 13 may be set up for internal use within a particular organization or business entity. For example, the customers or clients of the relationship analyzer may be part of the same business entity which implements the machine learning service. An Internet-based retailer may utilize such a private machine learning service infrastructure to help manage its item catalogs in some embodiments.

Use Cases

The techniques described above, of training deep neural network models which may include mirrored or Siamese subnetworks that utilize an extensible multi-feature token model to generate relationship indicators with respect to various kinds of entity pairs may be extremely useful in a number of scenarios. The inventories of many retailers, including Internet-based retailers, may often include large numbers of items, with some items being produced or provided by other vendors and sold through the retailers' web sites. If multiple descriptions are provided by different information sources for the same underlying item, and included in a retailer's web site, this may lead to customer confusion and, potentially, to reduced sales. The deep neural network model may be able to prevent such situations by performing a more sophisticated analysis of item similarity than would be feasible if straightforward text comparisons were performed, or of comparisons were limited to unique item identifiers. The neural-network based analysis may also be useful in comparing the offerings of several different retailers, as well as for responding to various types of business analytics-related queries associated with several types of relationships.

Illustrative Computer System

Figure 14:
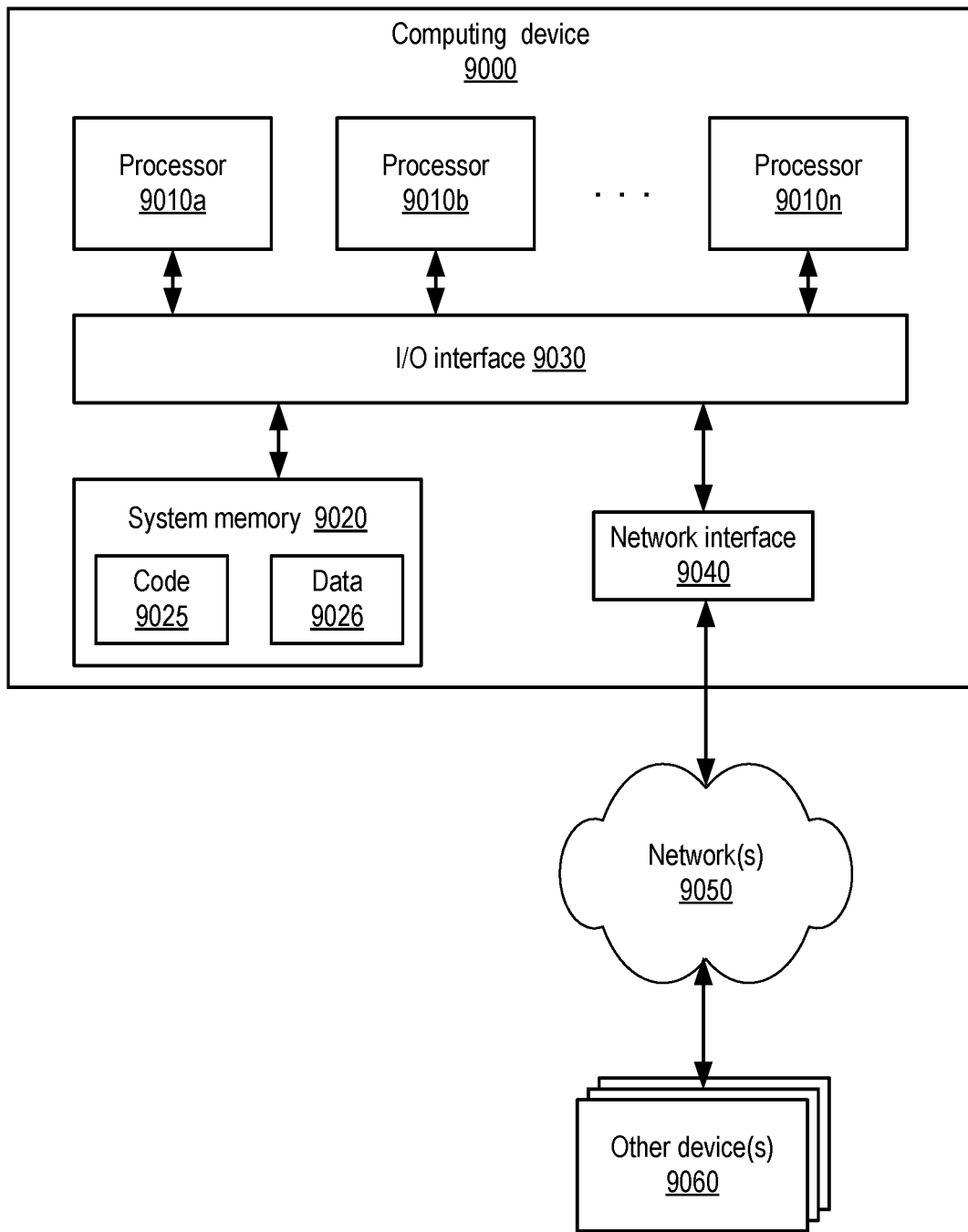
FIG. 14 is a block diagram illustrating an example computing device that may be used in at least some embodiments.

In at least some embodiments, a server that implements a portion or all of one or more of the technologies described herein, including the deep neural network-based relationship analysis techniques, as well as various components of a machine learning service may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a network-accessible machine learning service;
wherein the one or more computing devices are configured to:
obtain an indication of a first data set comprising a plurality of training records, wherein a first training record of the first data set comprises (a) a first item descriptor comprising respective values of one or more attributes of a first item, (b) a second item descriptor comprising respective values of one or more attributes of a second item and (c) an indicator of a similarity between the first item and the second item, wherein at least one attribute of the first item comprises text;
train, using the first data set, a neural network model to generate respective similarity scores with respect to pairs of item descriptors, wherein the neural network model comprises a first subnetwork and a second subnetwork in a mirrored configuration, wherein during training of the neural network model, an update to a weight associated with the first subnetwork is duplicated at the second subnetwork, wherein the neural network model comprises a token model in which a text token of a first attribute of a particular item descriptor of a first pair of item descriptors is represented by a plurality of features including (a) a first binary mask indicating whether another attribute of the particular item descriptor includes the text token and (b) a second binary mask indicating whether an attribute of the other item descriptor of the first pair includes the text token;
in response to determining that a similarity query indicating at least a source item descriptor and a similarity-candidate item descriptor has been submitted, generate, using the trained neural network model, a particular similarity score with respect to the source item descriptor and the similarity-candidate item descriptor; and
transmit, via a programmatic interface, the particular similarity score to a destination.

2. The system as recited in claim 1, wherein the neural network model comprises a recurrent neural network.

3. The system as recited in claim 2, wherein the recurrent neural network comprises one or more Long Short Term Memory (LSTM) units.

4. The system as recited in claim 1, wherein an objective function used to train the neural network model is based at least in part on a cross-entropy loss metric.

5. The system as recited in claim 1, wherein the one or more computing devices are configured to:
generate, using respective instances of the trained neural network model at a plurality of execution platforms of a provider network, respective similarity scores pertaining to a plurality of item descriptor pairs.

6. A method, comprising:
performing, by one or more computing devices:
obtaining an indication of a first data set comprising a plurality of training records, wherein a first training record of the first data set comprises (a) a first item descriptor comprising respective values of one or more attributes of a first item, (b) a second item descriptor comprising respective values of one or more attributes of a second item and (c) an indicator of a similarity between the first item and the second item, wherein at least one attribute of the first item comprises text;
training, using the first data set, a neural network model to generate respective similarity scores with respect to pairs of item descriptors, wherein the neural network model comprises a token model in which a text token of a first attribute of a particular item descriptor of a first pair of item descriptors is represented by a plurality of features including a first feature indicating whether one or more attributes of the other item descriptor of the first pair include the text token;
generating, using the trained neural network model, a particular similarity score corresponding to a source item descriptor and a target item descriptor; and
storing the particular similarity score.

7. The method as recited in claim 6, wherein the neural network model comprises a first subnetwork and a second subnetwork arranged in a mirrored configuration, wherein a transformation function applied at a first node of the first subnetwork is applied at a second node of the second subnetwork.

8. The method as recited in claim 6, wherein the neural network model comprises a recurrent neural network.

9. The method as recited in claim 8, wherein the recurrent neural network comprises one or more Long Short Term Memory (LSTM) units.

10. The method as recited in claim 6, wherein an objective function used to train the model is based at least in part on a cross-entropy loss metric.

11. The method as recited in claim 6, wherein the neural network model comprises an attribute model corresponding to one or more attributes of an item descriptor, wherein respective outputs of the token model corresponding to one or more tokens of a particular attribute are provided as input to the attribute model, and wherein respective outputs of the attribute model corresponding to one or more attributes are provided as input to a fully-connected layer of nodes of the neural network model.

12. The method as recited in claim 6, wherein respective instances of a common attribute model are used to represent a plurality of attributes of an item descriptor.

13. The method as recited in claim 12, wherein individual ones of the plurality of attributes of the item descriptor correspond to respective attribute types, wherein initialization of a first instance of the attribute model comprises setting a first state variable to a first value based at least in part on a first attribute type, and wherein initialization of a second instance of the attribute model comprises setting the first state variable to a different value based at least in part on a second attribute type.

14. The method as recited in claim 6, further comprising performing, by the one or more computing devices:

obtaining, from an automated hyper-parameter optimization service, respective values of one or more hyper-parameters of the neural network model, wherein a particular hyper-parameter of the one or more hyper-parameters comprises one or more of: (a) a minimum token frequency for inclusion of a token in a dictionary, (b) a type of gradient descent algorithm to be used during training, (c) a dropout parameter, (d) a state vector size, (e) an intermediate result vector size, (f) a feature vector length, or (g) a number of nodes of a hidden layer of the neural network model.

15. The method as recited in claim 6, further comprising performing, by the one or more computing devices:

adding, to the token model, a feature indicated via a programmatic interface.

16. A non-transitory computer-accessible storage medium storing program instructions that when executed on one or more processors cause the one or more processors to:

obtain an indication of a first data set comprising a plurality of training records, wherein a first training record of the first data set comprises (a) a first entity descriptor comprising respective values of one or more attributes of a first entity, (b) a second entity descriptor comprising respective values of one or more attributes of a second entity and (c) a representation of a relationship between the first entity and the second entity, wherein at least one attribute of the first entity comprises text;

train, using the first data set, a neural network model to generate respective relationship indicators with respect to pairs of entity descriptors, wherein the neural network model comprises a token model in which a text token of a first attribute of a particular entity descriptor of a first pair of entity descriptors is represented by a plurality of features including a first feature, wherein the first feature is added to the token model in response to a request received via a programmatic interface; and transmit, to a destination, a particular relationship indicator generated using the trained neural network model, wherein the particular relationship indicator corresponds to a source entity descriptor and a target entity descriptor.

17. The non-transitory computer-accessible storage medium as recited in claim 16, wherein the neural network model comprises a first subnetwork and a second subnetwork arranged in a mirrored configuration, wherein a transformation function applied at a first node of the first subnetwork is applied at a second node of the second subnetwork.

18. The non-transitory computer-accessible storage medium as recited in claim 16, wherein the neural network model comprises a recurrent neural network.

19. The non-transitory computer-accessible storage medium as recited in claim 16, wherein a second feature of the plurality of features includes an indication of a case of one or more characters of the text token.

20. The non-transitory computer-accessible storage medium as recited in claim 16, wherein the destination comprises one or more of: (a) an inventory management system of an e-retail organization (b) a web site management system of an e-retail web site.

21. The non-transitory computer-accessible storage medium as recited in claim 16, wherein the relationship indicator transmitted to the destination comprises one or more of: (a) a difference score with respect to one or more attributes, (b) a similarity score with respect to one or more attributes, (c) an inclusion score indicating a probability that the source entity belongs to a group represented by the target entity, or (d) a participation score indicating a probability that the source entity has participated in an activity represented by the target entity.

22. The non-transitory computer-accessible storage medium as recited in claim 16, wherein the instructions when executed on one or more processors cause the one or more processors to:

generate the relationship indicator in response to a determination that a relationship query specifying the source entity and the target entity has been submitted, wherein the relationship query indicates a particular attribute with respect to which a relationship indicator is to be obtained.

* * * * *